United States Patent
Kim et al.

(10) Patent No.: US 11,271,436 B2
(45) Date of Patent: Mar. 8, 2022

(54) MULTI-COIL BASED WIRELESS POWER TRANSMISSION DEVICE AND METHOD

(71) Applicant: LG Electronics Inc., Seoul (KR)

(72) Inventors: Sungkyu Kim, Seoul (KR); Jeongkyo Seo, Seoul (KR); Jinmoo Park, Seoul (KR); Seonghun Lee, Seoul (KR); Bongsik Kwak, Seoul (KR); Jaesung Lee, Seoul (KR); Jihyun Lee, Seoul (KR); Gyunghwan Yook, Seoul (KR); Joonho Park, Seoul (KR); Youngchan Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/627,200

(22) PCT Filed: Jun. 28, 2018

(86) PCT No.: PCT/KR2018/007357
§ 371 (c)(1),
(2) Date: Dec. 27, 2019

(87) PCT Pub. No.: WO2019/004753
PCT Pub. Date: Jan. 3, 2019

(65) Prior Publication Data
US 2020/0244108 A1    Jul. 30, 2020

Related U.S. Application Data

(60) Provisional application No. 62/625,346, filed on Feb. 2, 2018, provisional application No. 62/548,979, filed
(Continued)

(51) Int. Cl.
*H02J 50/80*    (2016.01)
*H02J 50/12*    (2016.01)
(Continued)

(52) U.S. Cl.
CPC ............ *H02J 50/402* (2020.01); *H01F 38/14* (2013.01); *H02J 7/02* (2013.01); *H02J 50/12* (2016.02);
(Continued)

(58) Field of Classification Search
CPC .......... H02J 50/402; H02J 50/80; H02J 50/90; H02J 50/12; H02J 50/60; H02J 7/02;
(Continued)

(56) References Cited

U.S. PATENT DOCUMENTS

2007/0279002 A1* 12/2007 Partovi ............. G06K 19/0704
320/115
2008/0100297 A1* 5/2008 Ishii ................... G01R 33/3621
324/322
(Continued)

FOREIGN PATENT DOCUMENTS

KR    20110137393    12/2011
KR    20130099071    9/2013
(Continued)

*Primary Examiner* — John W Poos
*Assistant Examiner* — Alex W Lam
(74) *Attorney, Agent, or Firm* — Fish & Richardson P.C.

(57) ABSTRACT

A multi-coil based wireless power transmission device is disclosed that includes a primary coil array forming a magnetic coupling with a secondary coil provided in a wireless power reception device to transmit wireless power to the wireless power reception device; a plurality of inverters connected to a plurality of primary coils one-to-one to selectively drive each of the plurality of primary coils; a communication and control unit controlling the plurality of inverters and communication with the wireless power reception device such that at least one primary coil is driven based on the degree of magnetic coupling formed by each primary coil and the secondary coil, thereby determining output, which can be provided by the primary coil array, within a
(Continued)

value obtained by summing all the maximum outputs individually set to the respective primary coils.

17 Claims, 26 Drawing Sheets

Related U.S. Application Data on Aug. 23, 2017, provisional application No. 62/525,755, filed on Jun. 28, 2017, provisional application No. 62/525,754, filed on Jun. 28, 2017.

(51) Int. Cl.
| | | |
|---|---|---|
| *H01F 38/14* | (2006.01) | |
| *H02J 50/40* | (2016.01) | |
| *H02J 50/60* | (2016.01) | |
| *H02J 7/02* | (2016.01) | |
| *H04B 5/00* | (2006.01) | |
| *H02J 50/90* | (2016.01) | |
| *H04L 27/02* | (2006.01) | |

(52) U.S. Cl.
CPC .............. *H02J 50/60* (2016.02); *H02J 50/80* (2016.02); *H02J 50/90* (2016.02); *H04B 5/0037* (2013.01); *H04L 27/02* (2013.01)

(58) Field of Classification Search
CPC ........... H02J 50/40; H02J 50/10; H01F 38/14; H04B 5/0037; H04L 27/02; H04L 27/04
See application file for complete search history.

(56) References Cited

U.S. PATENT DOCUMENTS

| | | | | |
|---|---|---|---|---|
| 2012/0146425 | A1* | 6/2012 | Lee | H04B 5/0025 307/104 |
| 2014/0070764 | A1* | 3/2014 | Keeling | H02J 50/90 320/108 |
| 2016/0336759 | A1* | 11/2016 | Yamamoto | G01V 3/101 |
| 2018/0097403 | A1* | 4/2018 | Jung | H02J 50/80 |

FOREIGN PATENT DOCUMENTS

| | | |
|---|---|---|
| KR | 20140012359 | 2/2014 |
| KR | 20150057963 | 5/2015 |
| KR | 20160057278 | 5/2016 |

* cited by examiner

FIG. 9

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 10

| Preamble | ZERO | Response | Type | Info | Parity |
|----------|------|----------|------|------|--------|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

MULTI-COIL BASED WIRELESS POWER TRANSMISSION DEVICE AND METHOD

CROSS-REFERENCE TO RELATED APPLICATIONS

This application is a National Stage application under 35 U.S.C. § 371 of International Application No. PCT/KR2018/007357, filed on Jun. 28, 2018, which claims the benefit of U.S. Provisional Application No. 62/625,346, filed on Feb. 2, 2018, U.S. Provisional Application No. 62/548,979, filed on Aug. 23, 2017, U.S. Provisional Application No. 62/525,755, filed on Jun. 28, 2017, and U.S. Provisional Application No. 62/525,754, filed on Jun. 28, 2017. The disclosures of the prior applications are incorporated by reference in their entirety.

BACKGROUND OF THE DISCLOSURE

Field of the Disclosure

The present disclosure relates to wireless charging, and more particularly, to a multi-coil based wireless power transmission device and method.

Related Art

A wireless power transmission technology is a technology for wirelessly transferring power between a power source and an electronic device. Wireless power transmission technology, for example, allows a battery of a wireless terminal such as a smartphone or a tablet to be charged when the wireless terminal is simply placed on a wireless charging pad, thereby providing mobility, convenience and safety superior to a wired charging environment using an existing wired charging connector. The wireless power transmission technology is attracting attention to replace the existing wired power transmission environment in various fields such as consumer electronics, industrial devices, military equipment, automobiles, infrastructure, medical devices.

The wireless power consortium (WPC), an organization that leads standardization of wireless power transmission technology, classifies electronic devices into several groups according to the amount of power transmitted and received by electronic devices and establishes standards for each group. For example, a first group includes wearable devices such as smart watches, smart glasses, head mounted displays, and smart rings, and mobile electronic devices (or portable electronic devices) such as earphones, remote controllers, smartphones, PDAs, and tablet PCs, for which small power (about 5 W or less or about 20 W or less) standards are established. A second group includes small and medium home appliances such as laptops, robotic cleaners, TVs, acoustic appliances, vacuum cleaners, and monitors, for which medium-power (less than about 50 W or less than about 200 W) standards are established. A third group includes home appliances for kitchen such as blenders, microwave ovens, and electric cookers and personal mobile devices (or electronic devices/moving units) such as wheelchairs, electric kickboards, electric bicycles, and electric vehicles, for which large power (about 2 kW or less or 22 kW or less) standards are established.

The small power standards have already been enacted in various versions, and actively commercialized. New designs of wireless power transmission/reception devices have been developed to compensate for the existing shortcomings such as the extension of a charging area or the like. In addition, standards on medium and large power have gradually been discussed.

SUMMARY OF THE DISCLOSURE

The present disclosure provides a multi-coil-based wireless power transmission device and method.

The present disclosure is directed to compensating for an unchargeable state due to coil misalignment based on a multi-coil in a medium-power wireless power transmission system.

The present disclosure also provides a wireless power transmission device and a reception device in which a charging area may be easily extended based on a primary coil extension set, and a method of using the same.

The present disclosure also provides a method for selectively driving a primary coil and controlling power according to a change amount of a battery or a load of a reception device in a medium-power multi-coil wireless power transmission system.

In an aspect, a wireless power transmission device for transmitting wireless power to a wireless power reception device is provided. The device includes: a primary coil array forming magnetic coupling with a secondary coil provided in the wireless power reception device to transmit wireless power to the wireless power reception device, wherein the primary coil array includes a plurality of primary coils each having an individually set maximum output; a plurality of inverters connected to the plurality of primary coils, respectively, to selectively drive the plurality of primary coils; and a communication/control unit controlling communication with the wireless power reception device and the plurality of inverters such that at least one primary coil is driven based on the degree of magnetic coupling formed by each primary coil with the secondary coil, thereby determining an output, which can be provided by the primary coil array, within a value obtained by adding all the maximum outputs individually set to the plurality of primary coils.

The plurality of primary coils may vertically overlap each other and horizontally have a 2×2 matrix form.

All the individually set maximum outputs of the plurality of primary coils may be equal, and an output which can be provided by the primary coil array may be determined according to the number of the plurality of primary coils included in the primary coil array.

When the individually set maximum output is 15 W, a providable output may be 15 W or less if the plurality of inverters drive one primary coil, the providable output may be 30 W or less if the plurality of inverters drive two primary coils, the providable output may be 45 W or less if the plurality of inverters drive three primary coils, and the providable output may be 60 W or less if the plurality of inverters drive four primary coils.

The communication/control unit may perform communication with the wireless power reception device based on an amplitude shift keying (ASK) scheme.

The degree of magnetic coupling may be a size of a modulation depth, and a size of the modulation depth of the at least one primary coil may be changed by a predetermined range or greater.

The degree of magnetic coupling may be a size of a voltage profile of each of the primary coils, and a voltage profile of the at least one primary coil may be changed by a predetermined range or greater.

The degree of magnetic coupling may be the presence or absence of a resonance voltage at each of the primary coil, and the at least one primary coil may generate the resonance voltage.

The wireless power transmission device may further include: at least one second cell if the primary coil array is defined as one first cell, wherein one inverter may be connected to one of one primary coil included in the first cell and one primary coil included in the second cell through a switch.

The method may further include a plurality of parallel feedback resistors providing a variable charging voltage.

In another aspect, a method for transmitting wireless power to a wireless power reception device is provided. The method includes: selectively driving a plurality of primary coils each having an individually set maximum output using a plurality of inverts respectively connected to the plurality of primary coils; controlling communication with a wireless power reception device and the plurality of inverters such that at least one primary coil is driven based on the degree of magnetic coupling formed by each primary coil with a secondary coil provided in the wireless power reception device; determining an output which can be provided by the plurality of primary coils within a value obtained by adding all the maximum outputs individually set to the plurality of primary coils; and transmitting wireless power to the wireless reception device through the at least one driven primary coil within the determined output.

The plurality of primary coils may vertically overlap each other and horizontally have a 2×2 matrix form.

All the individually set maximum outputs of the plurality of primary coils may be equal, and an output which can be provided by the primary coil array may be determined according to the number of the plurality of primary coils included in the primary coil array.

When the individually set maximum output is 15 W, a providable output may be 15 W or less if the plurality of inverters drive one primary coil, the providable output may be 30 W or less if the plurality of inverters drive two primary coils, the providable output may be 45 W or less if the plurality of inverters drive three primary coils, and the providable output may be 60 W or less if the plurality of inverters drive four primary coils.

Communication with the wireless power reception device may be performed based on an amplitude shift keying (ASK) scheme.

The degree of magnetic coupling may be a size of a modulation depth, and a size of the modulation depth of the at least one primary coil may be changed by a predetermined range or greater.

The degree of magnetic coupling may be a size of a voltage profile of each of the primary coils, and a voltage profile of the at least one primary coil may be changed by a predetermined range or greater.

The degree of magnetic coupling may be the presence or absence of a resonance voltage at each of the primary coil, and the at least one primary coil may generate the resonance voltage.

At least one second cell may be further provided if the primary coil array is defined as one first cell, wherein one inverter may be connected to one of one primary coil included in the first cell and one primary coil included in the second cell through a switch.

In a medium-power wireless power transmission system, an unchargeable state due to coil misalignment may be compensated based on multi-coils, a charging area may be easily designed to be extended at low cost, and a position or alignment degree of freedom of a reception device may be increased. Further, a foreign object may be detected when the medium power multi-coil is driven, and the primary coils may be selectively driven and power may be controlled according to a change amount of the battery or the load.

BRIEF DESCRIPTION OF THE DRAWINGS

FIG. 9 illustrates a communication frame structure according to an embodiment.

FIG. 10 is a structure of a sync pattern according to an embodiment.

DESCRIPTION OF EMBODIMENTS

The term 'wireless power' below is used to mean any type of energy associated with an electric field, a magnetic field, and an electromagnetic field transmitted from a wireless power transmission device to a wireless power reception device without using physical electromagnetic conductors. The wireless power may also be referred to as a wireless power signal and may denote an oscillating magnetic flux enclosed by primary and secondary coils. For example, power conversion in a system to wirelessly charge devices including mobile phones, cordless phones, iPods, MP3 players, headsets, and the like will be described herein. In general, basic principles of wireless power transfer include all of, for example, a method of transferring power through magnetic coupling, a method of transferring power via radio frequency (RF), a method of transferring power via a microwave, and a method of transferring power via ultrasound.

Figure 1:
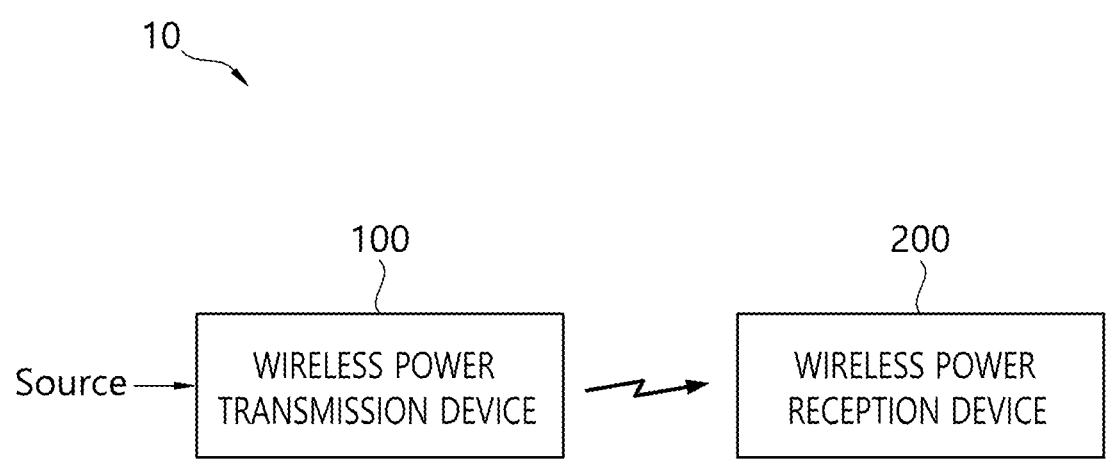
FIG. 1 is a block diagram of a wireless power system 10 according to an embodiment.

FIG. 1 is a block diagram of a wireless power system 10 according to an embodiment.

Referring to FIG. 1, the wireless power system 10 includes a wireless power transmission device 100 and a wireless power reception device 200.

The wireless power transmission device 100 generates a magnetic field upon receiving power from an external power source S. The wireless power reception device 200 generates a current using the generated magnetic field to receive power wirelessly.

In addition, in the wireless power system 10, the wireless power transmission device 100 and the wireless power reception device 200 may transmit and receive various information required for wireless power transmission. Here, communication between the wireless power transmission device 100 and the wireless power reception device 200 may be performed according to one of in-band communication using a magnetic field used for wireless power transmission or out-band communication using a separate communication carrier.

Here, the wireless power transmission device 100 may be provided as a fixed or mobile type. Examples of the fixed type may include a type embedded in ceilings, walls, or furniture such as tables in a room, a type installed to be implanted in outdoor parking lots, bus stops, subway stations, or a type installed in transportation such as vehicles or trains. The mobile wireless power transmission device 100 may be implemented as part of another device such as a cover of a notebook computer or a mobile device having a movable weight or size.

In addition, the wireless power reception device 200 should be interpreted as having a comprehensive concept including various electronic devices including a battery and various home appliances driven upon receiving power wirelessly instead of a power cable. Typical examples of the wireless power reception device 200 include a mobile terminal, a cellular phone, a smartphone, a personal digital assistant (PDA), a portable multimedia player (PMP), a Wibro terminal, a tablet, a pablet, a notebook, a digital camera, a navigation terminal, a television, an electric vehicle (EV), and the like.

Figure 2:
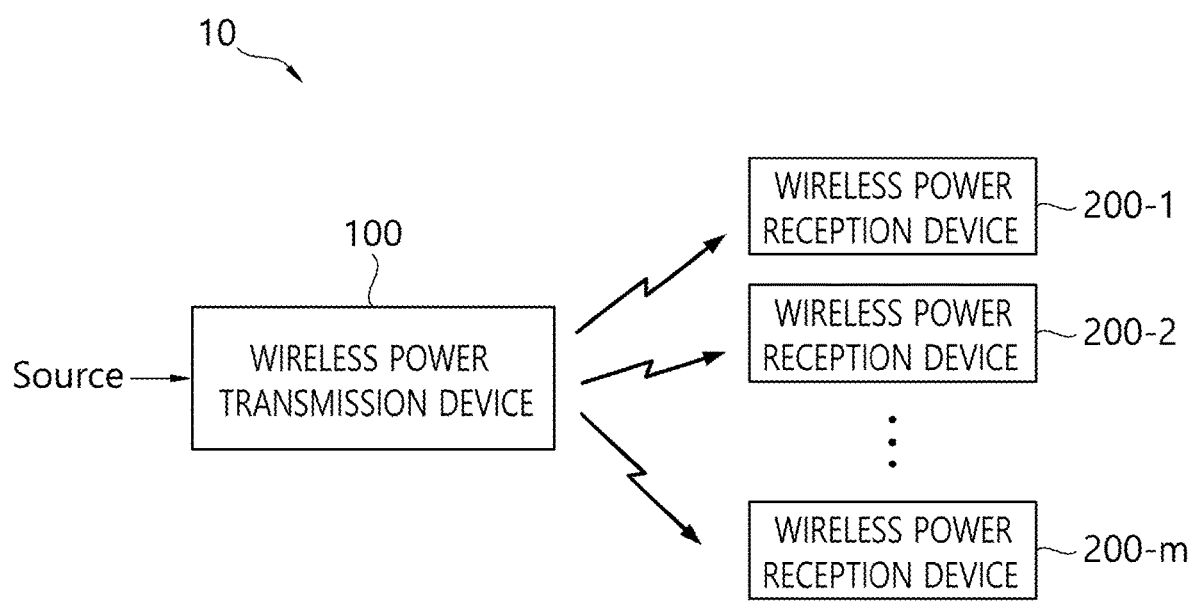
FIG. 2 is a block diagram of a wireless power system 10 according to another embodiment.

In the wireless power system 100, the wireless power reception device 200 may be one or plural. In FIG. 1, it is illustrated that the wireless power transmission device 100 and the wireless power reception device 200 exchange power one-to-one, but as shown in FIG. 2, one wireless power transmission device 100 may transmit power to a plurality of wireless power reception devices 200-1, 200-2, . . . , 200-m). In particular, in the case of performing wireless power transmission according to a magnetic resonant coupling scheme, one wireless power transmission device 100 may simultaneously transmit power to several wireless power reception devices 200-1, 200-2, . . . , 200-m by applying a simultaneous transmission scheme or a time division transmission scheme.

In addition, although FIG. 1 illustrates that the wireless power transmission device 100 directly transfers power to the wireless power reception device 200, a separate wireless power transceiver such as a relay or a repeater may be provided between the wireless power transmission device 100 and the wireless power reception device 200 to increase a wireless power transmission distance therebetween. In this case, power may be transferred from the wireless power transmission device 100 to the wireless power transceiver, and the wireless power transceiver may transmit power to the wireless power reception device 200.

A wireless power reception device, a power receiver, and a receiver mentioned in this disclosure refer to the wireless power reception device 200. In addition, a wireless power transmission device, a power transmitter, and a transmitter mentioned in the this disclosure refer to the wireless power reception device 100.

Figure 3:
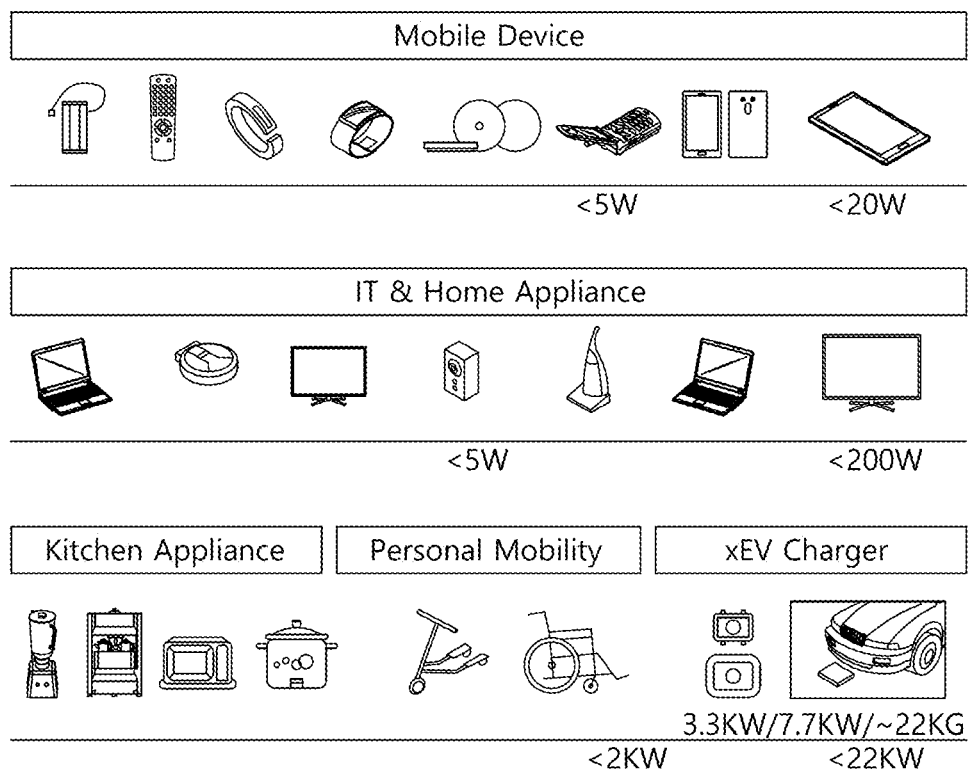
FIG. 3 illustrates an embodiment of various electronic devices in which a wireless power transmission system is introduced.

FIG. 3 illustrates an embodiment of various electronic devices in which a wireless power transmission system is introduced.

FIG. 3 illustrates electronic devices classified according to the amount of power transmitted and received in a wireless power transmission system. Referring to FIG. 3, a small power (about 5 W or less or about 20 W or less) wireless charging scheme may be applied to wearable devices such as smart watches, smart glasses, head mounted displays (HMD), and smart rings, and mobile electronic devices (or portable electronic devices) such as earphones, remote controllers, smartphones, PDAs, and tablet PCs.

A medium power (about 50 W or about 200 W or less) wireless charging scheme may be applied to medium and small home appliances such as laptops, robot cleaners, TVs, acoustic devices, vacuum cleaners, monitors, and the like. A large power (about 2 kW or less or 22 kW or less) wireless charging scheme may be applied to home appliances for kitchen such as blenders, microwave ovens, and electric cookers and personal moving devices (or electronic devices/ moving units) such as wheelchairs, electric kickboards, electric bicycles, electric vehicles, and the like.

The electronic devices/moving units described above (or illustrated in FIG. 1) may each include a wireless power receiver described below. Therefore, the above-described electronic devices/moving units may be charged upon receiving power wirelessly from the wireless power transmitter.

Hereinafter, a mobile device to which a power wireless charging scheme is applied will be described, but this is merely illustrative and the wireless charging method according to the present disclosure may be applied to various electronic devices described above.

Standards regarding wireless power transmission include wireless power consortium (WPC), air fuel alliance (AFA), and power matters alliance (PMA).

The WPC standard defines a baseline power profile (BPP) and an extended power profile (EPP). The BPP relates to a wireless power transmission device and reception device supporting 5 W power transmission, and the EPP relates to a wireless power transmission device and reception device supporting power transmission in a range larger than 5 W and smaller than 30 W.

Various wireless power transmission devices and reception devices using different power levels may be covered by each standard and classified into different power classes or categories.

For example, the WPC classifies wireless power transmission devices and reception devices into power class (PC)-1, PC0, PC1, and PC2, and provides standard documents for each PC. The PC-1 standard relates to wireless power transmission devices and reception devices that provide guaranteed power less than 5 W. Applications of the PC-1 include wearable devices such as smart watches.

The PC0 standard relates to a wireless power transmission device and reception device providing 5 W guaranteed power. The PC0 standard includes EPP with guaranteed power up to 30 W. In-band (IB) communication is a mandatory communication protocol of PC0, but out-of-band (OBB) communication, which is used as an optional backup channel, may also be used. The wireless power reception device may identify whether or not the OOB is supported by setting an OOB flag in a configuration pack. The wireless power transmission device supporting the OOB may enter an OOB handover phase by transmitting a bit pattern for OOB handover as a response to the configuration packet. The response to the configuration packet may be a NAK, ND or newly defined 8 bit pattern. Applications of PC0 include smartphones.

The PC1 standard relates to a wireless power transmission device and reception device providing guaranteed power of 30 W to 150 W. OOB is an essential communication channel for PC1, and IB is used as initialization and link establishment to OOB. As a response to the configuration packet, the wireless power transmission device may enter a bit pattern for OOB handover into the OOB handover phase. Applications in PC1 include laptops and power tools.

The PC2 standard relates to wireless power transmission device and reception device that provide guaranteed power from 200 W to 2 kW. Applications thereof include kitchen appliances.

As described above, PCs may be distinguished according to power levels, and whether to support compatibility between the same PCs may be optional or mandatory. Here, compatibility between the same PCs refers to that power transmission and reception between the same PCs is supported. For example, when the wireless power transmission device which is PC x is capable of charging a wireless power reception device having the same PC x, the compatibility between the same PCs may be maintained. Similarly, compatibility between different PCs may also be supported. Here, compatibility between different PCs refers to that power transmission and reception between different PCs is supported. For example, when a wireless power transmission device which is PC x is capable of charging a wireless power reception device having PC y, compatibility between the different PCs is considered to be maintained.

Support for compatibility between PCs is an important issue in terms of user experience and infrastructure construction. However, there are several technical problems in maintaining compatibility between PCs.

In the case of compatibility between the same PCs, for example, a lap-top charging wireless power reception device, which may be reliably charged only when power is continuously transmitted, may have a difficulty in stably receiving power from a power tool type wireless power transmission device which discontinuously transmits power, although the wireless power transmission device is a wireless power transmission device of the same PC. In addition, in case of compatibility between different PCs, for example, if a wireless power transmission device having a minimum guaranteed power of 200 W transmits power to a wireless power reception device having a maximum guaranteed power of 5 W, there is a risk of breakage due to overvoltage. As a result, PCs cannot be used as indicators/criteria that represent/indicate compatibility.

In the following description, a 'profile' is newly defined as an indicator/standard representing/indicating compatibility. That is, it may be construed that compatibility is maintained between wireless power transmission and reception devices having the same 'profile' is maintained to enable stable power transmission and reception and wireless power transmission and reception devices having different 'profiles' cannot transmit and receive power therebetween. Profiles may be defined depending on compatibility and/or application, regardless of power class (or independently).

For example, the profiles may be classified into four categories: i) mobile, ii) power tools, iii) kitchen, and iv) wearable.

In the case of the 'mobile' profile, the PC may be defined as PC0 and/or PC1, a communication protocol/method as IB and OOB, and an operating frequency as 87 to 205 kHz. Examples of the application may include a smartphone and a laptop-top.

In the case of the 'power tool' profile, the PC may be defined as PC1, the communication protocol/method as IB, and the operating frequency as 87 to 145 kHz. Examples of the application may include a power tool.

In the case of the 'kitchen' profile, the PC may be defined as PC2, the communication protocol/method as NFC-based, and the operating frequency as less than 100 kHz. Examples of the application may include a kitchen/home appliance.

In the case of a 'wearable' profile, the PC may be defined as PC-1, the communication protocol/method as IB, and the operating frequency as 87 to 205 kHz, and examples of an application may include a wearable device worn on a user's body.

Maintaining compatibility between the same profiles may be mandatory, and maintaining compatibility between different profiles may be optional.

The above-described profiles (mobile profile, power tool profile, kitchen profile, and wearable profile) may be generalized and represented as the first to n-th profiles, and a new profile may be added/replaced according to the WPC standard and the embodiment.

When the profiles are defined as described above, the wireless power transmission device selectively transmits power only to a wireless power reception device having the same profile as that of the wireless power transmission device, thereby enabling more stable power transmission. In addition, a burden on the wireless power transmission device may be reduced, and since power transmission to an incompatible wireless power reception device is not attempted, thereby reducing a risk of breakage to the wireless power reception device.

PC1 in the 'mobile' profile may be defined by borrowing an optional extension such as OOB based on PC0, and the 'power tool' profile may be defined as a version formed by simply modifying the PC1 'mobile' profile. In addition, until now, the profiles are defined for the purpose of maintaining compatibility between the same profiles, but in the future, a technology may be developed toward maintaining compatibility between different profiles. The wireless power transmission device or the wireless power reception device may inform its counterpart of its profile through various methods.

In the AFA standard, a wireless power transmission device is referred to as a power transmitting unit (PTU), a wireless power reception device as a power receiving unit (PRU), and PTUs are classified into a plurality of classes as shown in Table 1 and PRUs may be classified into a plurality of categories as shown in Table 2.

TABLE 1

|  | $P_{TX\_IN\_MAX}$ | Minimum category support requirement | Minimum value for maximum supported device number |
|---|---|---|---|
| Class 1 | 2 W | 1x category 1 | 1x category 1 |
| Class 2 | 10 W | 1x category 3 | 2x category 2 |
| Class 3 | 16 W | 1x category 4 | 2x category 3 |
| Class 4 | 33 W | 1x category 5 | 3x category 3 |
| Class 5 | 50 W | 1x category 6 | 4x category 3 |
| Class 6 | 70 W | 1x category 7 | 5x category 3 |

TABLE 2

| PRU | $P_{RX\_OUT\_MAX}$ | Example application |
|---|---|---|
| Category 1 | TBD | Bluetooth headset |
| Category 2 | 3.5 W | Feature phone |
| Category 3 | 6.5 W | Smartphone |
| Category 4 | 13 W | Tablet, pablet |
| Category 5 | 25 W | Small form factor laptop |
| Category 6 | 37.5 W | General laptop |
| Category 7 | 50 W |  |

As shown in Table 1, a maximum output power capability of class n PTU is greater than or equal to the $P_{TX\_IN\_MAX}$ value of the corresponding class. The PRU may not draw more power than specified in the corresponding category.

Figure 4:
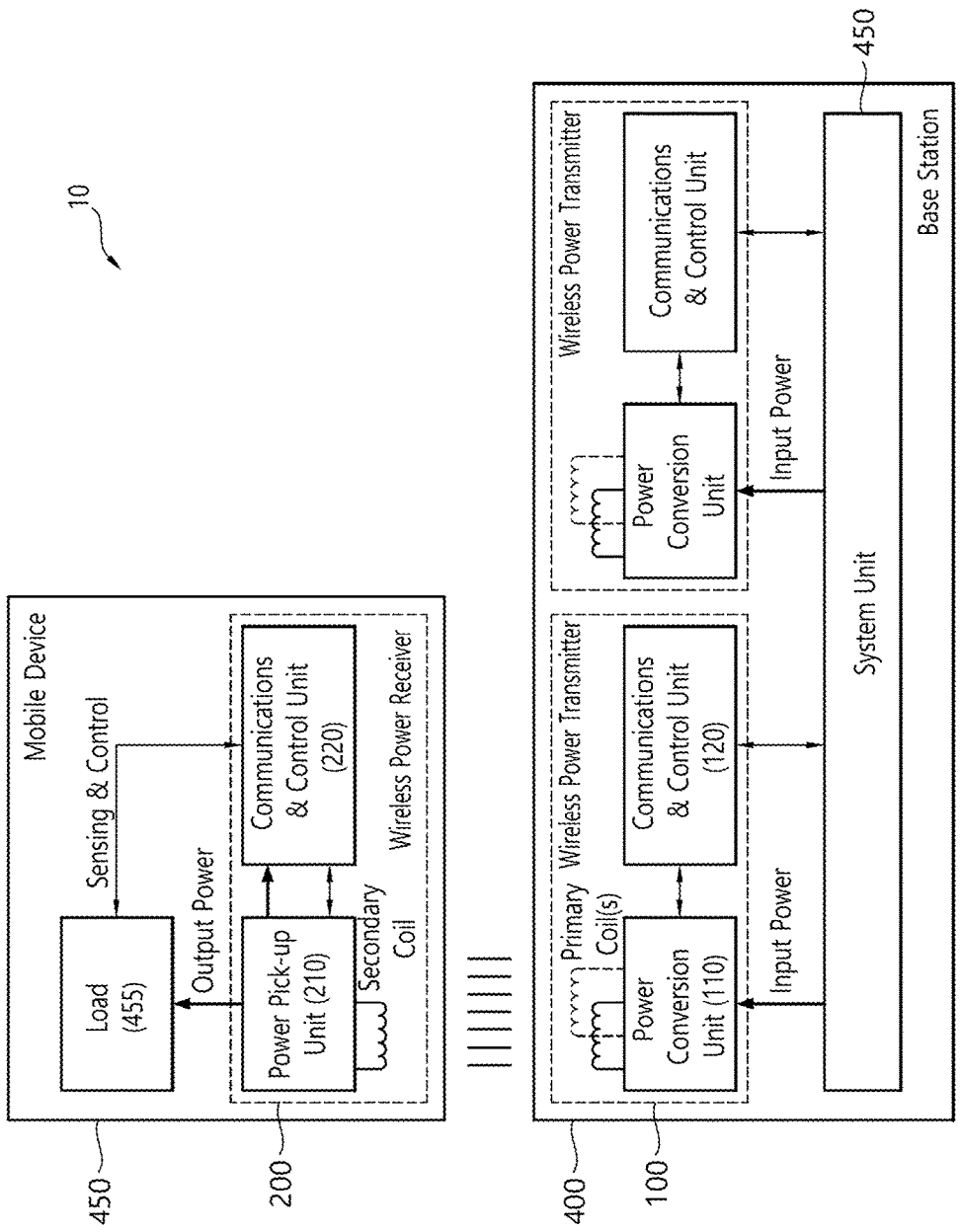
FIG. 4 is a block diagram of a wireless power transmission system according to another embodiment.

FIG. 4 is a block diagram of a wireless power transmission system according to another embodiment.

Referring to FIG. 4, the wireless power transmission system 10 includes a mobile device 450 that receives power wirelessly and a base station 400 that transmits power wirelessly.

The base station 400 is an device for providing induced power or resonance power and may include at least one wireless power transmission device 100 and a system unit 405. The wireless power transmission device 100 may transmit induced power or resonance power and control transmission. The wireless power transmission device 100 may include a power conversion unit 110 converting electrical energy into a power signal by generating a magnetic field through a primary coil(s) and a communication/control unit 120 controlling communication and power transfer with the wireless power reception device 200 to transmit power at an appropriate level. The system unit 405 may perform other operational control of the wireless power transmission device 100, such as input power provisioning, control of a plurality of wireless power transmission devices, and user interface control.

The primary coil may generate an electromagnetic field using AC power (or voltage or current). The primary coil may receive AC power (or voltage or current) having a specific frequency output from the power conversion unit 110, thereby generating a magnetic field having a specific frequency. The magnetic field may be generated non-radially or radially, and the wireless power reception device 200 receives the magnetic field to generate a current. In other words, the primary coil transmits power wirelessly.

In an inductive coupling scheme, the primary coil and the secondary coil may have certain suitable forms, such as copper wire wound around a product having high permeability such as ferrite or amorphous metal. The primary coil may be referred to as a primary core, primary winding, primary loop antenna, or the like. Meanwhile, the secondary coil may also be referred to as a secondary core, secondary winding, secondary loop antenna, pickup antenna, or the like.

In the case of using the magnetic resonant coupling scheme, the primary coil and the secondary coil may be provided in the form of a primary resonance antenna and a secondary resonance antenna, respectively. The resonance antenna may have a resonant structure including a coil and a capacitor. Here, a resonance frequency of the resonance antenna is determined by inductance of the coil and capacitance of the capacitor. Here, the coil may be in the form of a loop. In addition, a core may be disposed in the loop. The core may include a physical core such as a ferrite core or an air core.

Energy transmission between a primary resonance antenna and a secondary resonance antenna may be made through a resonance phenomenon of a magnetic field. The resonance phenomenon refers to a phenomenon in which a high efficiency energy transfer occurs between resonance antennas as the resonance antennas are coupled when a near field corresponding to a resonance frequency occurs in one resonance antenna and another resonance antenna is located nearby. When a magnetic field corresponding to a resonance frequency is generated between a primary resonance antenna and a secondary resonance antenna, a phenomenon occurs in which the primary resonance antenna and the secondary resonance antenna resonate with each other, and in this case, a magnetic field is focused on the secondary resonance antenna with high efficiency as compared with a case where the magnetic field generated in the primary resonance antenna is radiated in a free space, and therefore, energy may be transferred from the primary resonance antenna to the secondary resonance antenna with high efficiency. The inductive coupling scheme may be implemented similarly to the magnetic resonant coupling scheme, but in this case, a frequency of the magnetic field does not need to be the resonance frequency. Instead, in the inductive coupling scheme, loops configuring the primary and secondary coils need to be matched and a spacing between the loops must be very close.

Although not shown, the wireless power transmission device 100 may further include a communication antenna. The communication antenna may transmit and receive communication signals using communication carriers other than magnetic field communication. For example, the communication antenna may transmit and receive communication signals such as Wi-Fi, Bluetooth, Bluetooth LE, ZigBee, and NFC.

The communication/control unit 120 may transmit/receive information with the wireless power reception device 200. The communication/control unit 120 may include at least one of an IB communication module and an OOB communication module.

The IB communication module may transmit and receive information using a magnetic wave having a specific frequency as a center frequency. For example, the communication/control unit 120 may perform in-band communication by including information in magnetic waves and transmitting the magnetic waves through the primary coil or by receiving magnetic waves containing information through the primary coil. Here, the information may be included in the magnetic waves or the magnetic waves including the information may be interpreted using modulation schemes such as binary phase shift keying (BPSK) or amplitude shift keying (ASK) and coding schemes such as Manchester coding or non-return-to-zero level (NZR-L) coding. Using this IB communication, the communication/control unit 120 may transmit and receive information to a distance up to several meters away at a data rate of several kbps.

The OOB communication module may perform out-band communication via a communication antenna. For example, the communication/control unit 120 may be provided as a short-range communication module. Examples of the short-range communication module include a communication module such as Wi-Fi, Bluetooth, Bluetooth LE, ZigBee, NFC, and the like.

The communication/control unit 120 may control the overall operation of the wireless power transmission device 100. The communication/control unit 120 may perform calculation and processing of various types of information and control each component of the wireless power transmission device 100.

The communication/control unit 120 may be implemented as a computer or similar device using hardware, software, or a combination thereof. In hardware, the communication/control unit 120 may be provided in the form of an electronic circuit that processes an electrical signal to perform a control function. In software, the communication/control unit 120 may be provided in the form of a program for driving the hardware communication/control unit 120.

The communication/control unit 120 may control transmission power by controlling an operating point. The controlled operating point may correspond to a combination of frequency (or phase), duty cycle, duty ratio, and voltage amplitude. The communication/control unit 120 may control transmission power by adjusting at least one of frequency (or phase), duty cycle, duty ratio, and voltage amplitude. In addition, the wireless power transmission device 100 may supply constant power, and the wireless power reception device 200 may control reception power by controlling a resonance frequency.

The mobile device 450 includes the wireless power reception device 200 receiving wireless power through the secondary coil and a load 455 receiving power from the wireless power reception device 200 and store and supply the received power to a device.

The wireless power reception device 200 may include a power pick-up unit 210 and a communication/control unit 220. The power pick-up unit 210 may receive wireless power through the secondary coil and convert the wireless power into electrical energy. The power pick-up unit 210 rectifies and converts an AC signal obtained through the secondary coil into a DC signal. The communication/control unit 220 may control transmission and reception (power transmission and reception) of wireless power.

The secondary coil may receive wireless power transmitted from the wireless power transmission device 100. The secondary coil may receive power by using a magnetic field generated by the primary coil. Here, when a specific frequency is a resonance frequency, a magnetic resonance phenomenon may occur between the primary coil and the secondary coil, so that power may be more efficiently received.

Although not shown in FIG. 4, the communication/control unit 220 may further include a communication antenna. The communication antenna may transmit and receive communication signals using communication carriers other than magnetic field communication. For example, the communication antenna may transmit and receive communication signals such as Wi-Fi, Bluetooth, Bluetooth LE, ZigBee, NFC, and the like.

The communication/control unit 220 may transmit/receive information with the wireless power transmission device 100. The communication/control unit 220 may include at least one of an IB communication module or an OOB communication module.

The IB communication module may transmit and receive information using a magnetic wave having a specific frequency as a center frequency. For example, the communication/control unit 220 may perform in-band communication by including information in magnetic waves and transmitting the magnetic waves through the secondary coil or by receiving magnetic waves containing information through the secondary coil. Here, the information may be included in the magnetic waves or the magnetic waves including the information may be interpreted using modulation schemes such as binary phase shift keying (BPSK) or amplitude shift keying (ASK) and coding schemes such as Manchester coding or non-return-to-zero level (NZR-L) coding. Using this IB communication, the communication/control unit 220 may transmit and receive information to a distance up to several meters away at a data rate of several kbps.

The OOB module may perform out-band communication via a communication antenna. For example, the communication/control unit 220 may be provided as a short-range communication module.

Examples of the short-range communication module include a communication module such as Wi-Fi, Bluetooth, Bluetooth LE, ZigBee, NFC, and the like.

The communication/control unit 220 may control the overall operation of the wireless power reception device 200. The communication/control unit 220 may perform calculation and processing of various types of information and control each component of the wireless power reception device 200.

The communication/control unit 220 may be implemented as a computer or similar device using hardware, software, or a combination thereof. In hardware, the communication/control unit 220 may be provided in the form of an electronic circuit that processes an electrical signal to perform a control function. In software, the communication/control unit 220 may be provided in the form of a program for driving the hardware communication/control unit 220.

The load 455 may be a battery. The battery may store energy using power output from the power pick-up unit 210. Meanwhile, the battery does not necessarily need to be included in the mobile device 450. For example, the battery may be provided as an external component in a removable form. For another example, the wireless power reception device 200 may include a driving unit for driving various operations of the electronic device instead of a battery.

The mobile device 450 is illustrated to include the wireless power reception device 200, and the base station 400 is illustrated to include the wireless power transmission device 100, but in a broad sense, the wireless power reception device 200 may be identified with the mobile device 450 and the wireless power transmission device 100 may be identified with the base station 400.

Hereinafter, a coil or a coil unit may be referred to as a coil assembly, a coil cell, or a cell including a coil and at least one element adjacent to the coil.

Figure 5:
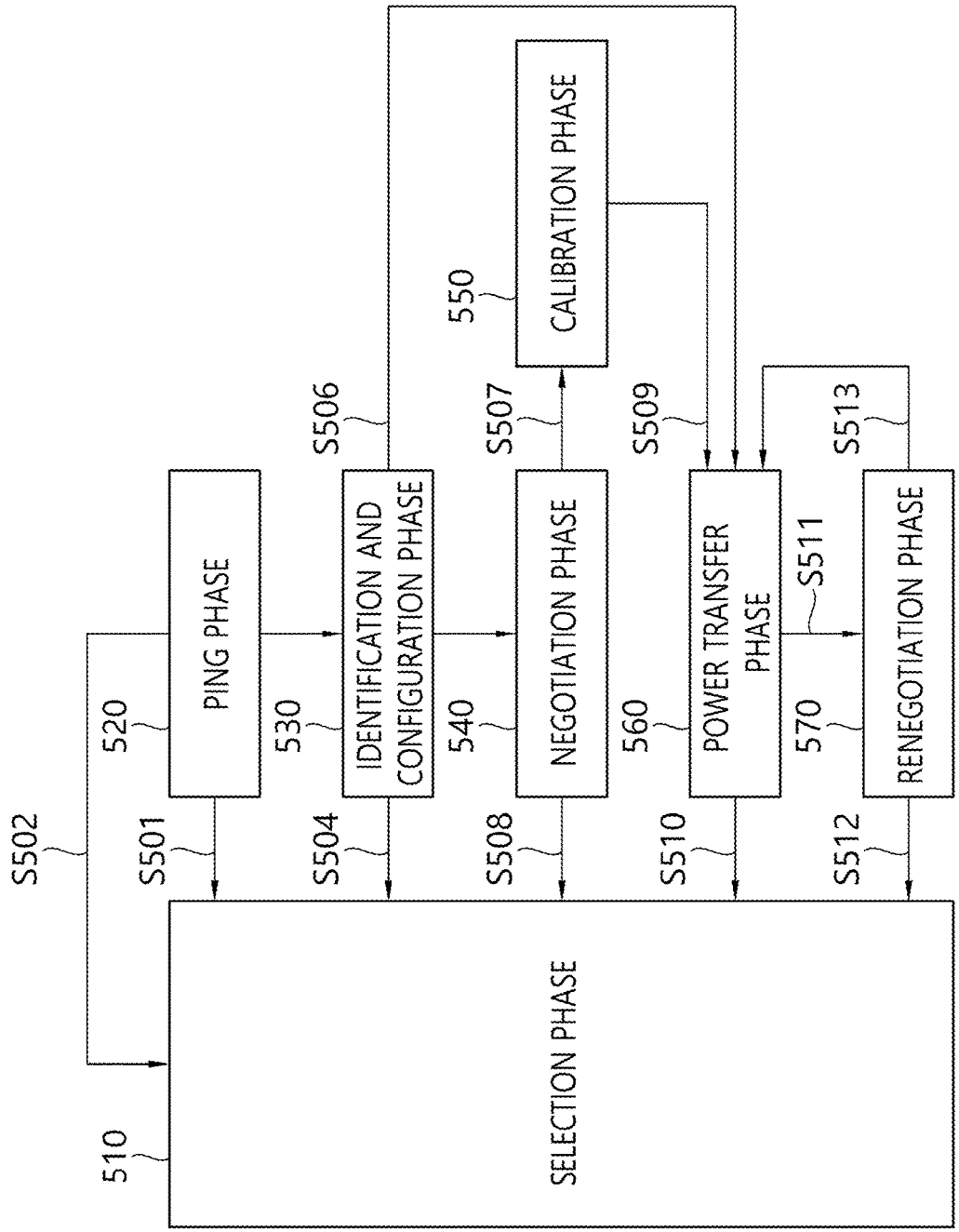
FIG. 5 is a state transition diagram illustrating a wireless power transmission procedure.

FIG. 5 is a state transition diagram illustrating a wireless power transmission procedure.

Referring to FIG. 5, power transmission from a wireless power transmission device to a receiver according to an embodiment of the present disclosure may be divided into a selection phase 510, a ping phase 520, identification and configuration phase 530, a negotiation phase (540), a calibration phase (550), a power transfer phase (560) and a renegotiation phase (570).

The selection phase 510 may be a phase, including, for example, S502, S504, S508, S510, and S512, transited when a specific error or a specific event is detected while starting or maintaining power transmission. Here, the specific error and specific event will be apparent from the following description. In the selection phase 510, the wireless power transmission device may monitor whether an object exists on the interface surface. If the wireless power transmission device detects that an object is placed on an interface surface, it may transition to the ping phase 520. In the selection phase 510, the wireless power transmission device may transmit an analog ping signal of a very short pulse and detect whether an object is present in an active area of an interface surface based on a change in current of a transmission coil or a primary coil.

If an object is detected in the selection phase 510, the wireless power transmission device may measure a quality factor of a wireless power resonance circuit (e.g., power transmission coil and/or resonance capacitor). According to an embodiment of the present disclosure, when an object is detected in the selection phase 510, a quality factor may be measured to determine whether a wireless power reception device is placed together with a foreign object in a charging area. In the coil provided in the wireless power transmission device, inductance and/or a series resistance component in the coil may be reduced due to environmental changes, thereby reducing the quality factor value. In order to determine the presence or absence of a foreign object using the measured quality factor value, the wireless power transmission device may receive a reference quality factor value measured in advance in a state where no foreign object is placed in the charging area from the wireless power reception device. The presence of a foreign object may be determined by comparing the reference quality factor value received in the negotiation phase S540 with the measured quality factor value. However, in the case of a wireless power reception device having a low reference quality factor value (for example, a specific wireless power reception device may have a low reference quality factor value depending on a type, purpose, and characteristics thereof), there is no significant difference between the measured quality factor value and the reference quality factor value, so it may be difficult to determine the presence of a foreign object. Therefore, whether a foreign object is present must be determined by considering other determination factors or using other method.

In another embodiment of the present disclosure, when an object is detected in the selection phase 510, a quality factor value in a specific frequency range (e.g., operating frequency range) may be measured to determine whether a foreign object is disposed together in the charging area. In the coil of the wireless power transmission device, the inductance and/or the series resistance component in the coil may be reduced due to environmental changes, and thus a resonance frequency of the coil of the wireless power transmission device may be changed (shifted). That is, a quality factor peak frequency, which is a frequency at which a maximum quality factor value in an operating frequency band is measured, may be shifted.

When the object is detected in the ping phase 520, the wireless power transmission device wakes up the receiver and transmits a digital ping for identifying whether the detected object is a wireless power reception device. If the wireless power transmission device does not receive a response signal (e.g., a signal strength packet) regarding the digital ping from the receiver in the ping phase 520, the wireless power transmission device may transition back to the selection phase 510. In addition, if the wireless power transmission device receives a signal indicating that the power transmission is completed, that is, a charging completion packet, in the ping phase 520, the wireless power transmission device may transition to the selection phase 510.

When the ping phase 520 is completed, the wireless power transmission device may transition to the identification and configuration phase 530 for identifying a receiver and collecting receiver configuration and status information.

If an unexpected packet is received, if a desired packet is not received for a predefined time (time out), if there is a packet transmission error, or if a power transfer contract is not set in the identification and configuration phase 530, the wireless power transmission device may transition to the selection phase 510.

The wireless power transmission device may determine whether entry into the negotiation phase 540 is necessary based on a negotiation field value of a configuration packet received in the identification and configuration phase 530. If negotiation is necessary as a result of the determination, the wireless power transmission device may enter the negotiation phase 540 and perform a predetermined foreign object detection (FOD) procedure. Meanwhile, if it is determined that negotiation is not necessary, the wireless power transmission device may directly enter the power transfer phase 560.

In operation 540, the wireless power transmission device may receive an FOD status packet including a reference quality factor value. Alternatively, the wireless power transmission device may receive an FOD status packet including a reference peak frequency value. Alternatively, the wireless power transmission device may receive a status packet including the reference quality factor value and the reference peak frequency value. Here, the wireless power transmission device may determine a quality factor threshold for FOD based on the reference quality factor value. The wireless power transmission device may determine a peak frequency threshold for FOD based on the reference peak frequency value.

The wireless power transmission device may detect whether a foreign object (FO) exists in the charging area by using the determined quality factor threshold for FOD and the currently measured quality factor value (quality factor value measured before the ping phase) and control power transmission according to the detection result. For example, when an FO is detected, power transmission may be stopped, but is not limited thereto.

The wireless power transmission device may detect whether an FO exists in the charging area by using the determined peak frequency threshold for FOD and the currently measured peak frequency value (peak frequency value measured before the ping phase) and control power transmission according to the detection result. For example, when an FO is detected, power transmission may be stopped, but is not limited thereto.

When the FO is detected, the wireless power transmission device may return to the selection phase 510. Meanwhile, when no FO is detected, the wireless power transmission device may enter the power transfer phase 560 through the calibration phase 550. In detail, when no FO is detected, the wireless power transmission device may determine strength of power received at a reception end (receiver) in the calibration phase 550, and measure a power loss at the receiver and a transmission end (transmitter) to determine strength of the power transmitted from the transmitter. That is, the wireless power transmission device may predict power loss based on a difference between the transmit power of the transmitter and the receive power of the receiver in the calibration phase 550. The wireless power transmission device according to an embodiment may correct the threshold for FOD detection by reflecting the predicted power loss.

If an unexpected packet is received, if a desired packet is not received for a predefined time (time out), if there is a violation of a predetermined power transfer contract, or if charging is completed in the power transfer phase 560, the wireless power transmission device may transition to selection phase 510.

In addition, if it is necessary to reconfigure the power transfer contract in accordance with a state change of the wireless power transmission device in the power transfer phase 560, the wireless power transmission device may transition to the renegotiation phase 570. Here, when the renegotiation is normally completed, the wireless power transmission device may return to the power transfer phase 560.

The power transfer contract may be set based on state and characteristic information of the wireless power transmission device and the receiver. For example, the wireless power transmission device state information may include information on a maximum amount of power that may be transmitted, information on a maximum number of receivers that may be accommodated, and the like, and the receiver state information may include information on required power.

Figure 6:
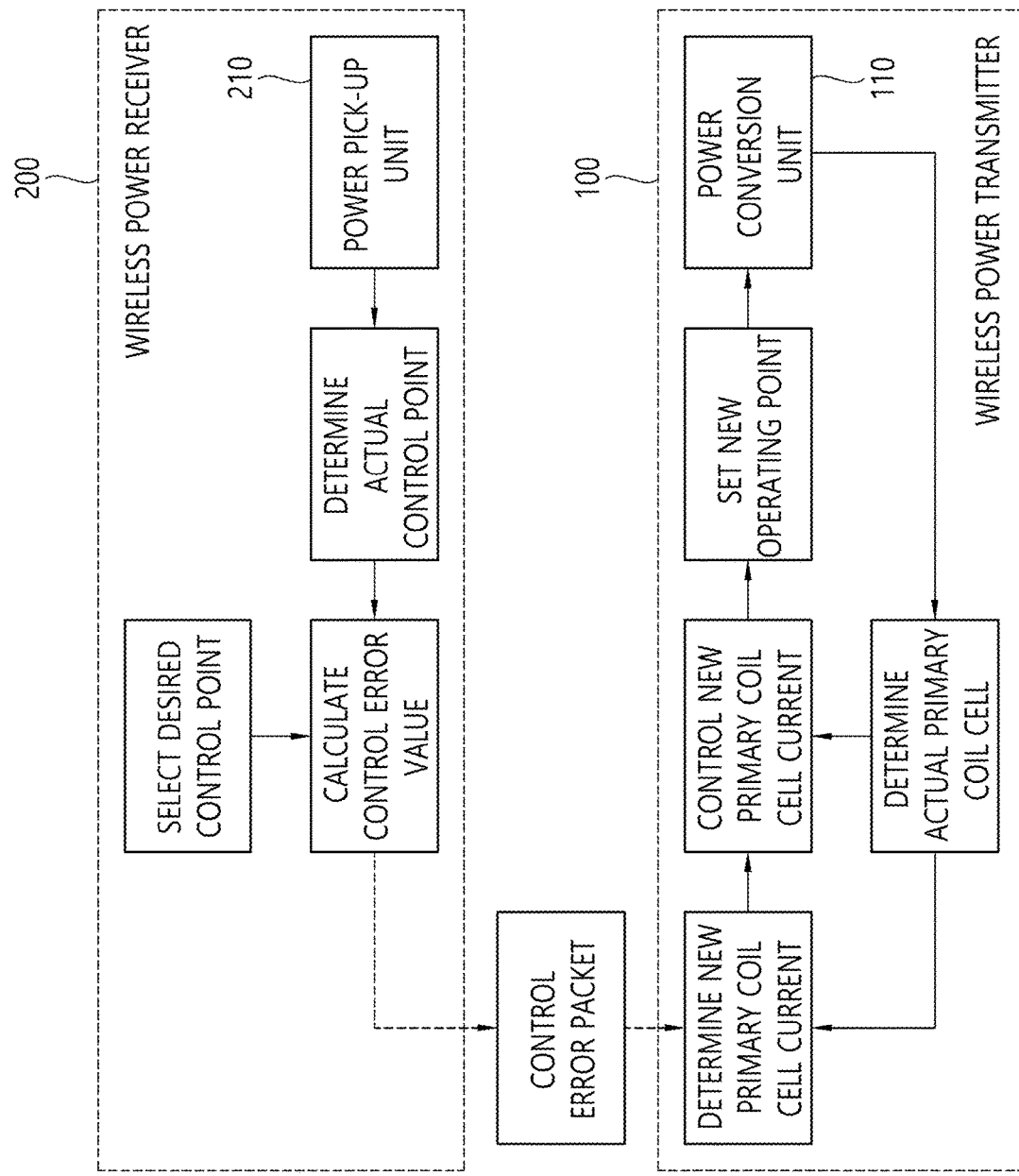
FIG. 6 illustrates a power control method according to an embodiment.

FIG. 6 illustrates a power control method according to an embodiment.

In FIG. 6, in the power transfer phase 560, the wireless power transmission device 100 and the wireless power reception device 200 may control the amount of power transmitted by performing communication in parallel with power transmission and reception. The wireless power transmission device and the wireless power reception device operate at a specific control point. The control point represents a combination of voltage and current provided at an output terminal of the wireless power reception device when power transmission is performed.

In more detail, the wireless power reception device selects a desired control point (a desired output current/voltage, temperature at a specific position of the mobile device) and additionally determine an actual control point which is currently operating. The wireless power reception device may calculate a control error value using the desired control point and the actual control point, and transmit the calculated control error value as a control error packet to the wireless power transmission device.

The wireless power transmission device may control power transmission by setting/controlling a new operating point (amplitude, frequency, and duty cycle) using the received control error packet. Therefore, the control error packet is transmitted/received at predetermined time intervals in the power transfer phase. As an example, in order to reduce a current of the wireless power transmission device, the wireless power reception device may set the control error value to a negative number and transmit the same, and in order to increase the current, the wireless power reception device may set the control error value to a positive number and transmit the same. As described above, in the induction mode, the wireless power reception device may control power transmission by transmitting the control error packet to the wireless power transmission device.

In a resonance mode described below, the resonance mode may operate in a manner different from that of the induction mode. In the resonant mode, one wireless power transmission device should be able to simultaneously serve a plurality of wireless power reception devices. However, in the case of controlling the power transfer as in the induction mode described above, since the transferred power is controlled by communication with one wireless power reception device, power transfer to additional wireless power reception devices may be difficult to control. Therefore, in the resonant mode of the present disclosure, a method in which the wireless power transmission device commonly transmits basic power and the wireless power reception device controls a power amount by controlling a resonance frequency thereof is used. However, the method described above with reference to FIG. 6 is not completely excluded even in the operation of the resonance mode, and the additional transmission power may be controlled by the method of FIG. 6.

Figure 7:
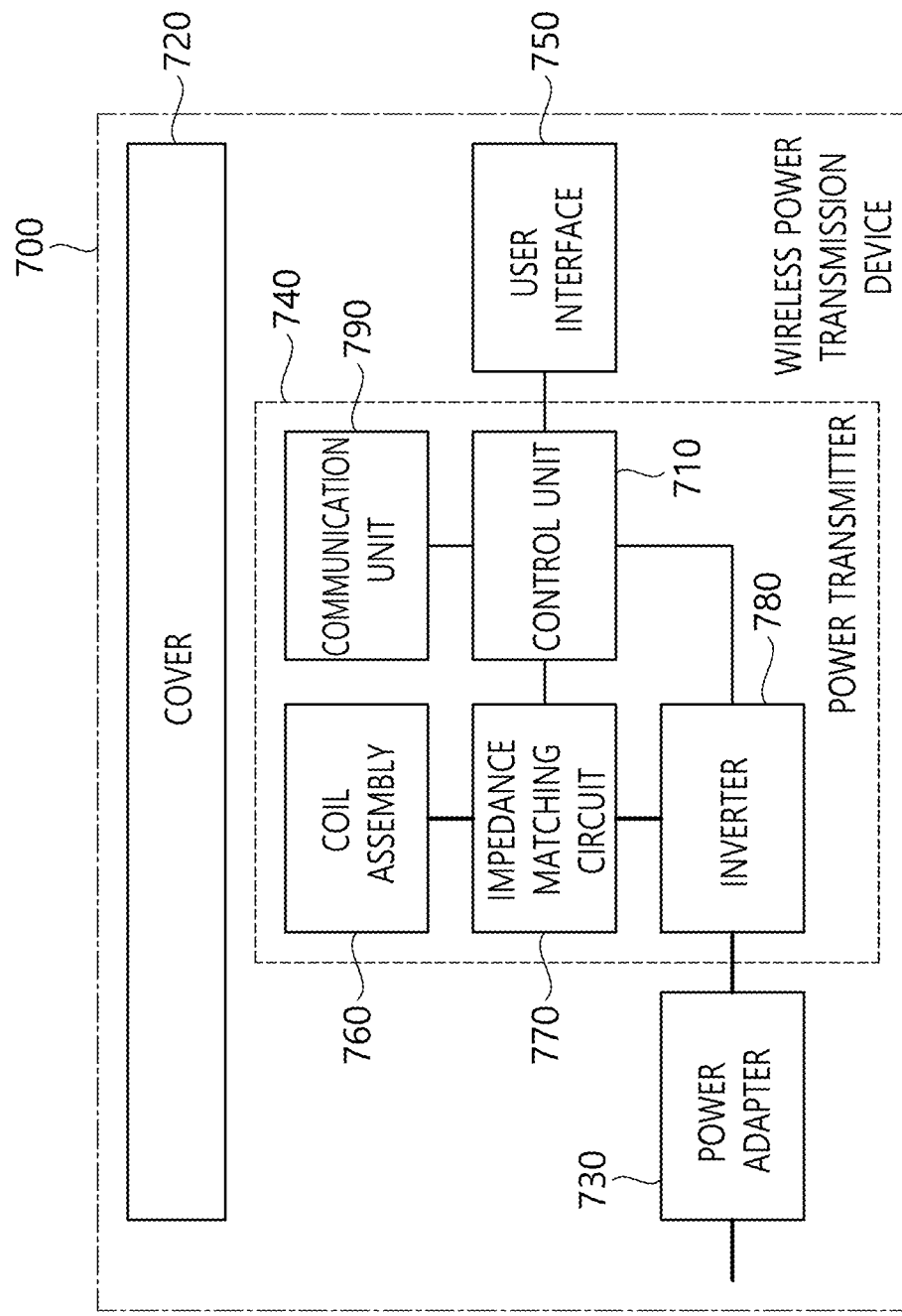
FIG. 7 is a block diagram of a wireless power transmission device according to another embodiment.

FIG. 7 is a block diagram of a wireless power transmission device according to another embodiment. The wireless power transmission device may belong to a wireless power transfer system of a magnetic resonant coupling or shared mode. The shared mode may refer to a mode in which one-to-many communication and charging are performed between the wireless power transmission device and the wireless power reception device. The shared mode may be implemented based on the inductive coupling scheme or the magnetic resonant coupling scheme.

Referring to FIG. 7, the wireless power transmission device 700 may include at least one of a cover 720 covering a coil assembly, a power adapter 730 supplying power to a power transmitter 740, the power transmitter for transmitting wireless power, or a user interface 750 performing power transmission and providing other related information. In particular, the user interface 750 may be optional or may be included as another user interface 750 of the wireless power transmission device 700.

The power transmitter 740 may include at least one of a coil assembly 760, an impedance matching circuit 770, an inverter 780, a communication unit 790, or a control unit 710.

The coil assembly 760 may include at least one primary coil that generates a magnetic field and may also be referred to as a coil cell.

The impedance matching circuit 770 may provide impedance matching between the inverter and the primary coil(s). Impedance matching circuit 770 may generate resonance at a suitable frequency that boosts the primary coil current. The impedance matching circuit in the multi-coil power transmitter 740 may further include a multiplex that routes a signal to a subset of primary coils in the inverter. The impedance matching circuit may also be referred to as a tank circuit.

The impedance matching circuit 770 may include a capacitor, an inductor, and a switching element for switching connection therebetween. The impedance matching may be performed by detecting a reflected wave of wireless power transmitted through the coil assembly 760 and adjusting a connection state of the capacitor or the inductor, adjusting capacitance of the capacitor, or adjusting inductance of the inductor by switching a switching element based on the detected reflected wave. In some cases, the impedance matching circuit 770 may be omitted, and this disclosure also includes an embodiment of the wireless power transmission device 700 in which the impedance matching circuit 770 is omitted.

The inverter 780 may convert a DC input into an AC signal. The inverter 780 may be driven half-bridge or full-bridge to generate pulse waves and duty cycles of adjustable frequency. The inverter may also include a plurality of stages to adjust an input voltage level.

The communication unit 790 may perform communication with a power receiver. The power receiver performs load modulation to communicate requests and information regarding the power transmitter. Accordingly, the power transmitter 740 may monitor an amplitude and/or phase of a current and/or voltage of the primary coil to demodulate data transmitted from the power receiver using the communication unit 790.

In addition, the power transmitter 740 may control output power to transmit data through the communication unit 790 using a frequency shift keying (FSK) scheme.

The control unit 710 may control communication and power transmission of the power transmitter 740. The control unit 710 may control power transmission by adjusting the operating point described above. The operating point may be determined by at least one of an operating frequency, a duty cycle, or an input voltage, for example.

The communication unit 790 and the control unit 710 may be provided as separate units/elements/chipsets or may be provided as a single unit/element/chipset.

Figure 8:
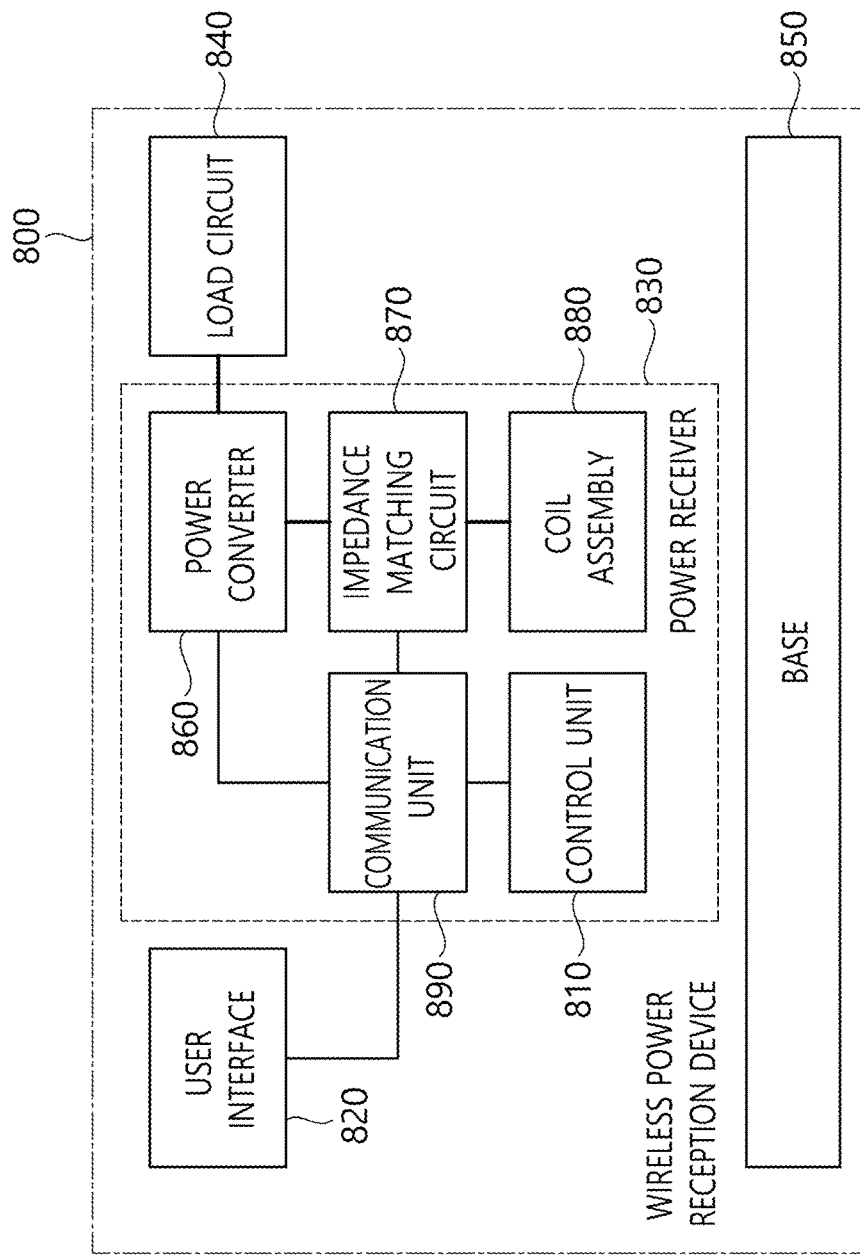
FIG. 8 illustrates a wireless power reception device according to another embodiment.

FIG. 8 illustrates a wireless power reception device according to another embodiment. The wireless power reception device may belong to a wireless power transfer system of a magnetic resonant coupling or shared mode.

In FIG. 8, the wireless power reception device 800 may include at least one of a user interface 820 performing power transmission and providing other related information, a power receiver 830 receiving wireless power, a load circuit 840, or a base 850 supporting and covering the coil assembly. In particular, the user interface 820 may be optional or may be included as another user interface 820 of the power receiving equipment.

The power receiver 830 may include at least one of a power converter 860, an impedance matching circuit 870, a coil assembly 880, a communication unit 890, or a control unit 810.

The power converter 860 may convert AC power received from the secondary coil to a voltage and current suitable for the load circuit. As an embodiment, the power converter 860 may include a rectifier. The rectifier may rectify the received wireless power and convert it from alternating current to direct current. The rectifier may convert alternating current into direct current using diodes or transistors and smooth the direct current using capacitors and resistors. As the rectifier, a full-wave rectifier, a half-wave rectifier, a voltage multiplier, or the like implemented by a bridge circuit may be used. In addition, the power converter may adapt reflected impedance of the power receiver.

The impedance matching circuit 870 may provide impedance matching between a combination of the power converter 860 and the load circuit 870 and the secondary coil. As an embodiment, the impedance matching circuit may generate resonance near 100 kHz that may strengthen power transfer. The impedance matching circuit 870 may include a capacitor, an inductor, and a switching element for switching a combination thereof. Impedance matching may be performed by controlling the switching element of a circuit configuring the impedance matching circuit 870 based on a voltage value, current value, power value, frequency value, etc., of the received wireless power. In some cases, the impedance matching circuit 870 may be omitted, and this disclosure also includes an embodiment of the wireless power reception device 200 in which the impedance matching circuit 870 is omitted.

The coil assembly 880 includes at least one secondary coil and may optionally further include an element that shields a metallic portion of the receiver from a magnetic field.

The communication unit 890 may perform load modulation to communicate requests and other information to the power transmitter.

To this end, the power receiver 830 may switch a resistor or a capacitor to change reflection impedance.

The control unit 810 may control received power. To this end, the control unit 810 may determine/calculate a difference between an actual operating point of the power receiver 830 and a desired operating point. The control unit 810 may adjust/reduce the difference between the actual operating point and the desired operating point by performing an adjustment of the reflection impedance of the power transmitter and/or the operating point adjustment request of the power transmitter. Optical power reception may be performed by minimizing the difference.

The communication unit 890 and the control unit 810 may be provided as separate devices/chipsets or may be provided as a single device/chipset.

FIG. 9 illustrates a communication frame structure according to an embodiment. The communication frame structure may be a communication frame structure in a shared mode.

Referring to FIG. 9, in the shared mode, different types of frames may be used together. For example, in the shared mode, a slotted frame having a plurality of slots such as (A) and a free format frame having no specific form such as (B) may be used. More specifically, the slotted frame is a frame for the transmission of short data packets from the wireless power reception device 200 to the wireless power transmission device 100, and the free format frame does not have a plurality of slots and is able to transmit long data packets.

Meanwhile, the slotted frame and the free format frame may be changed to various names by those skilled in the art. For example, the slotted frame may be renamed as a channel frame and the free format frame may be renamed to a message frame or the like.

More specifically, the slotted frame may include a sync pattern indicating the start of a slot, a measurement slot, 9 slots, and additional sync patterns having the same time interval before each of the 9 slots.

Here, the additional sync pattern is a sync pattern different from the sync pattern indicating the start of the frame described above. More specifically, the additional sync pattern may indicate information related to adjacent slots (i.e., two consecutive slots located next to the sync pattern) without indicating the start of a frame.

A sync pattern may be located between two consecutive slots of the 9 slots. In this case, the sync pattern may provide information related to the two consecutive slots.

In addition, the 9 slots and the sync patterns provided ahead of each of the 9 slots may have the same time interval. For example, the 9 slots may have a time interval of 50 ms. In addition, the nine sync patterns may have a time length of 50 ms.

Meanwhile, the free format frame as shown in (B) may not have a specific shape other than the sync pattern indicating the start of the frame and the measurement slot. That is, the free format frame, which is to play a different role than the slotted frame, may be used to perform a communication of long data packets (e.g., additional owner information packets) between the wireless power transmission device and the wireless power reception device or select one of a plurality of coils in the wireless power transmission device including the plurality of coils.

Hereinafter, the sync pattern included in each frame will be described in more detail with reference to the accompanying drawings.

FIG. 10 illustrates a structure of a sync pattern according to an embodiment.

Referring to FIG. 10, the sync pattern may include a preamble, a start bit, a response field, a type field, an information (Info) field, and a parity bit. In FIG. 10, the start bit is shown as ZERO.

More specifically, the preamble consists of consecutive bits and may all be set to 0. That is, the preamble may be bits for adjusting a time length of the sync pattern.

The number of bits configuring the preamble may be dependent on an operating frequency within a range in which the length of the sync pattern is closest to 50 ms, but not exceeding 50 ms. For example, when the operating frequency is 100 kHz, the sync pattern may consist of two preamble bits, and when the operating frequency is 105 kHz, the sync pattern may consist of three preamble bits.

The start bit is a bit that follows the preamble and may mean zero. The zero may be a bit indicating a type of the sync pattern. Here, the kind of sync pattern may include a frame sync including frame related information and a slot sync including slot information. That is, the sync pattern may be the frame sync located between consecutive frames and indicating the start of the frame or may be the slot sync located between consecutive slots among a plurality of slots configuring a frame and including information related to the consecutive slots.

For example, if zero is 0, it may indicate that the corresponding slot is a slot sync located between slots, and if 1, it may indicate that the corresponding sync pattern is a frame sync located between the frames.

The parity bit is a last bit of the sync pattern and may indicate information on the number of bits configuring data fields (i.e., response field, type field, and information field) of the sync pattern. For example, the parity bit may be 1 when the number of bits configuring the data fields of the sync pattern is an even number, and may be 0 in other cases (i.e., odd number).

The response field may include response information of the wireless power transmission device for communication with the wireless power reception device in the slot before the sync pattern. For example, the response field may have '00' when performing of communication with the wireless power reception device is not detected. In addition, the response field may have '01' when a communication error is detected during communication with the wireless power reception device. The communication error may be a case where two or more wireless power reception devices attempt to access one slot, and thus a collision occurs between the two or more wireless power reception devices.

In addition, the response field may include information indicating whether a data packet is accurately received from the wireless power reception device. More specifically, the response field may be "10" (10—not acknowledge, NAK) when the wireless power transmission device denies the data packet, and may be "11" (11—acknowledge, ACK) when the wireless power transmission device confirms the data packet.

The type field may indicate a type of a sync pattern. More specifically, the type field may have '1' indicating a frame sync when the sync pattern is a first sync pattern (i.e., the first sync pattern of the frame, located before the measurement slot).

In addition, in the slotted frame, the type field may have '0' indicating a slot sync when the sync pattern is not a first sync pattern of the frame.

In addition, the meaning of the value of the information field may be determined according to the type of the sync pattern indicated by the type field. For example, when the type field is 1 (that is, indicating a frame sync), the meaning of the information field may indicate the type of the frame. That is, the information field may indicate whether the current frame is a slotted frame or a free-format frame. For example, when the information field is '00', the slotted frame may be indicated, and when the information field is '01', the free format frame may be indicated.

In contrast, when the type field is 0 (i.e., in the case of slot sync), the information field may indicate a state of a next slot located behind the sync pattern. More specifically, the information field may have '00' if the next slot is a slot allocated to a specific wireless power reception device, '01' if the slot is locked for temporary use by a specific wireless power reception device, or '10' if the slot is freely used by a certain wireless power reception device.

Figure 11:
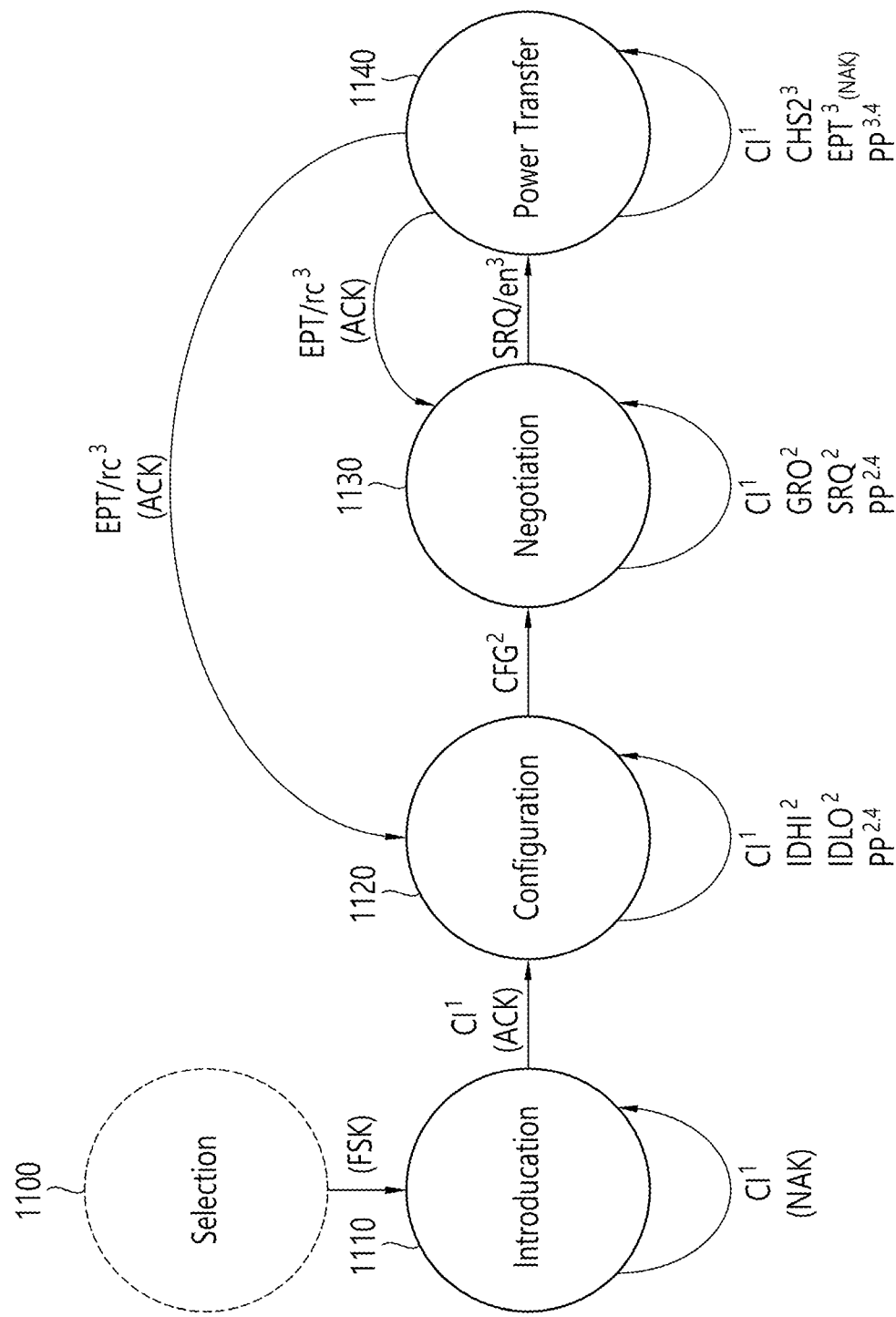
FIG. 11 illustrates an operational state of a wireless power transmission device and a wireless power reception device in a shared mode according to an embodiment.

FIG. 11 illustrates an operational state of a wireless power transmission device and a wireless power reception device in a shared mode according to an embodiment.

Referring to FIG. 11, the wireless power reception device operating in the shared mode may operate in one of a selection phase 1100, an introduction phase 1110, a configuration phase 1120, a negotiation phase 1130, and a power transfer phase 1140.

First, in order to detect a wireless power reception device, the wireless power transmission device according to an embodiment may transmit a wireless power signal. That is, a process of detecting a wireless power reception device using the wireless power signal may be referred to as analog ping.

Meanwhile, the wireless power reception device that receives the wireless power signal may enter the selection phase 1100. As described above, the wireless power reception device entering the selection phase 1100 may detect the presence of an FSK signal on the wireless power signal.

That is, the wireless power reception device may perform communication in one of an exclusive mode and a shared mode according to the presence or absence of the FSK signal.

More specifically, if the wireless power signal includes the FSK signal, the wireless power reception device may operate in the shared mode, or otherwise, the wireless power reception device may operate in the exclusive mode.

When the wireless power reception device operates in the shared mode, the wireless power reception device may enter the introduction phase 1110. In the introduction phase 1110, the wireless power reception device may transmit a control information packet to the wireless power transmission device to transmit a control information (CI) packet in the configuration phase, the negotiation phase, and the power transfer phase. The control information packet may have information related to a header and control. For example, the control information packet may have a header of 0X53.

In the introduction phase 1110, the wireless power reception device attempts to request a free slot through the following configuration, negotiation, and power transfer phases to transmit a control information (CI) packet. Here, the wireless power reception device selects a free slot and transmits a first CI packet. If the wireless power transmission device responds with an ACK to the corresponding CI packet, the wireless power transmission device enters the configuration phase. If the wireless power transmission device responds with a NACK, another wireless power reception device is in the process of configuration and negotiation. In this case, the wireless power reception device reattempts the request of the free slot.

If the wireless power reception device receives the ACK in response to the CI packet, the wireless power reception device determines a position of a private slot in a frame by counting remaining slot sinks up to a first frame sink. In all subsequent slot based frames, the wireless power reception device transmits the CI packet through that slot.

If the wireless power transmission device allows the wireless power reception device to proceed to the configuration phase, the wireless power transmission device provides a series of locked slots for exclusive use of the wireless power reception device. This ensures that the wireless power reception device performs the configuration phase without a conflict.

The wireless power reception device transmits sequences of data packets, such as two identification data packets IDHI and IDLO using a locked slot. Upon completion of this phase, the wireless power reception device enters the negotiation phase. In the negotiation phase, the wireless power transmission device continues to provide the wireless power reception device with the locked slot for exclusive use. This ensures that the wireless power reception device performs the negotiation phase without a conflict.

The wireless power reception device transmits one or more negotiation data packets using the corresponding locked slot, which may be mixed with private data packets. Eventually, the corresponding sequence ends with a specific request (SRQ) packet. Upon completion of the sequence, the wireless power reception device enters the power transfer phase and the wireless power transmission device stops providing locked slots.

In the power transfer phase, the wireless power reception device performs transmission of the CI packet using the allocated slot and receives the power. The wireless power reception device may include a regulator circuit. The regulator circuit may be included in the communication/control unit. The wireless power reception device may self-regulate reflected impedance of the wireless power reception device via the regulator circuit. In other words, the wireless power reception device may adjust the reflected impedance to transmit the amount of power required by an external load. This may prevent excessive power reception and overheating.

In the shared mode, since the wireless power transmission device may not perform power adjustment as a response to the received CI packet (depending on the operation mode), control is necessary to prevent an overvoltage condition.

Hereinafter, a wireless power transmission device having a multi-coil and an operation of the wireless power transmission device will be described in detail.

Figure 12A:
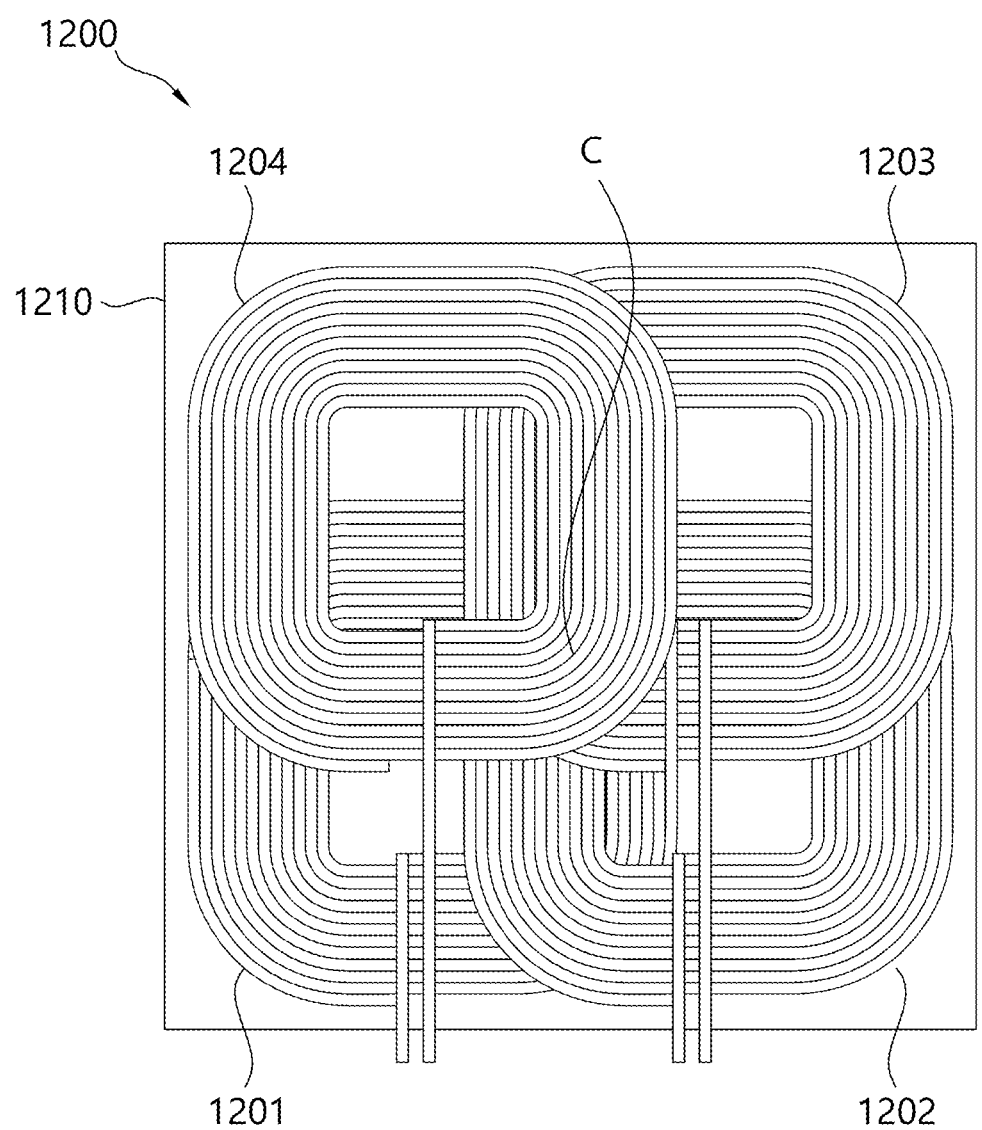
FIGS. 12A and 12B are a plan view and a side view illustrating a primary coil array and a shielding member included in a wireless power transmission device according to an embodiment, respectively.
Figure 12B:
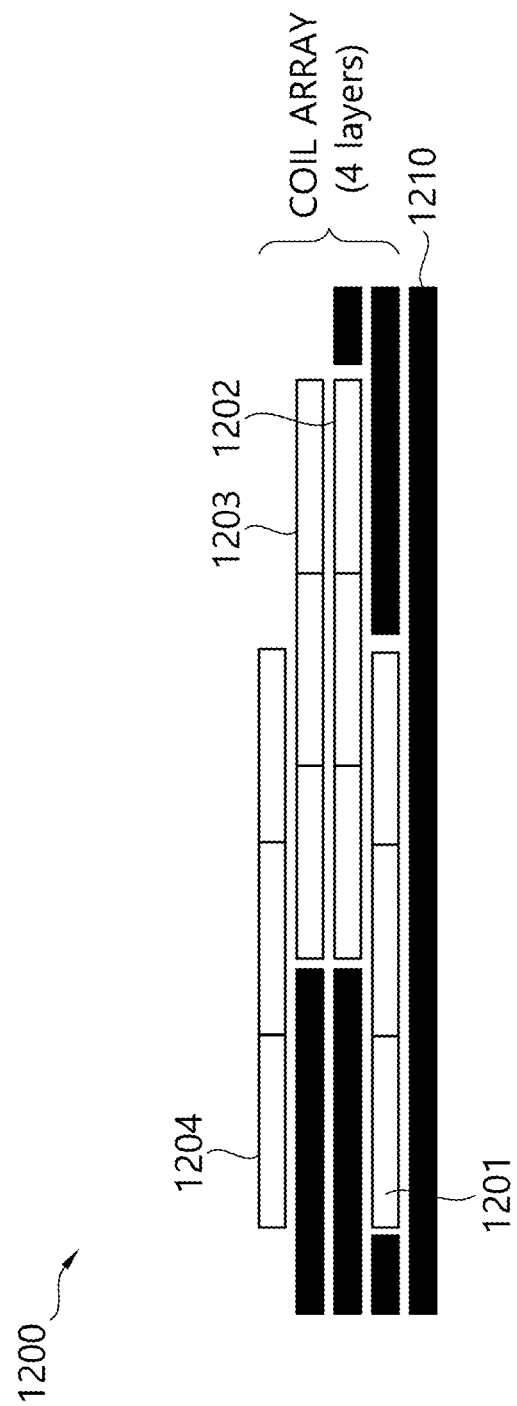

FIGS. 12A and 12B are plan and side views illustrating a primary coil array and a shielding member included in the wireless power transmission device according to an embodiment, respectively.

Referring to FIGS. 12A and 12B, a wireless power transmission device includes a module 1200 including a shielding member 1210 and a primary coil array 1201, 1202, 1203, and 1204 in which a plurality of primary coils are disposed on the shielding member 1210 and arranged in an overlapping manner. Here, the wireless power transmission device may be the wireless power transmission device 100 of FIG. 4 and the module 1200 may be the power conversion unit 110.

The primary coil array 1201, 1202, 1203, and 1204 has a stacked structure in which each primary coil forms one layer vertically (z direction) and a primary coil 1201 of a first layer to a primary coil 1204 of a fourth layer overlap each other in a counterclockwise direction (or clockwise direction) on a horizontal plane (x-y plane). Thus, the primary coil array 1201, 1202, 1203, and 1204 is divided into four quadrants planarly based on the center C thereof, the primary coils of each layer are evenly disposed in each quadrant. For example, the first-layer primary coil 1201 may be disposed in a third quadrant, the second-layer primary coil 1202 may be disposed in a fourth quadrant, the third-layer primary coil 1203 may be disposed in a first quadrant, and fourth-layer primary coil 1204 may be disposed in a second quadrant. That is, the primary coil array 1201, 1202, 1203, and 1204 have a square shape of 2×2 in the horizontal plane.

Figure 12C:
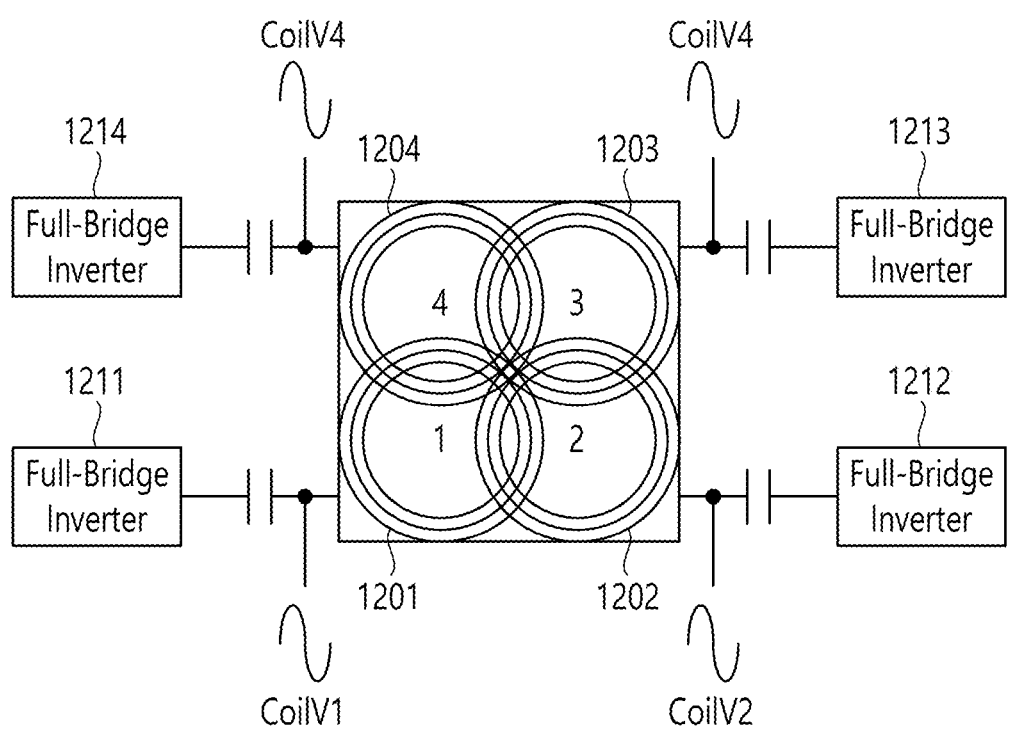
FIG. 12C illustrates that a dedicated driving circuit is connected to each primary coil according to an embodiment.

The primary coils according to the present embodiment may be driven (or activated) individually. In order to be individually drive (or activate) the primary coils, a dedicated driving circuit (i.e., an inverter) may be connected to each primary coil as shown in FIG. 12C. For example, in the case of the primary coil array 1201, 1202, 1203, and 1204 of FIG. 12C, the primary coils and the inverters may be respectively connected, so that a total of four inverters may be required. That is, independent power is applied to each primary coil. Accordingly, depending on the position where a secondary coil 1205 is placed on the module 1200 including the primary coil array as shown in FIG. 12C, only one primary coil may be selectively driven (or activated) (a) or a plurality of primary coils may be selectively driven (or activated) at the same time (b, c). As described above, since the primary coil array 1201, 1202, 1203, and 1204 extend a charging area as compared to a single primary coil, a positional or alignment freedom of the receiver may be enhanced.

Figure 13:
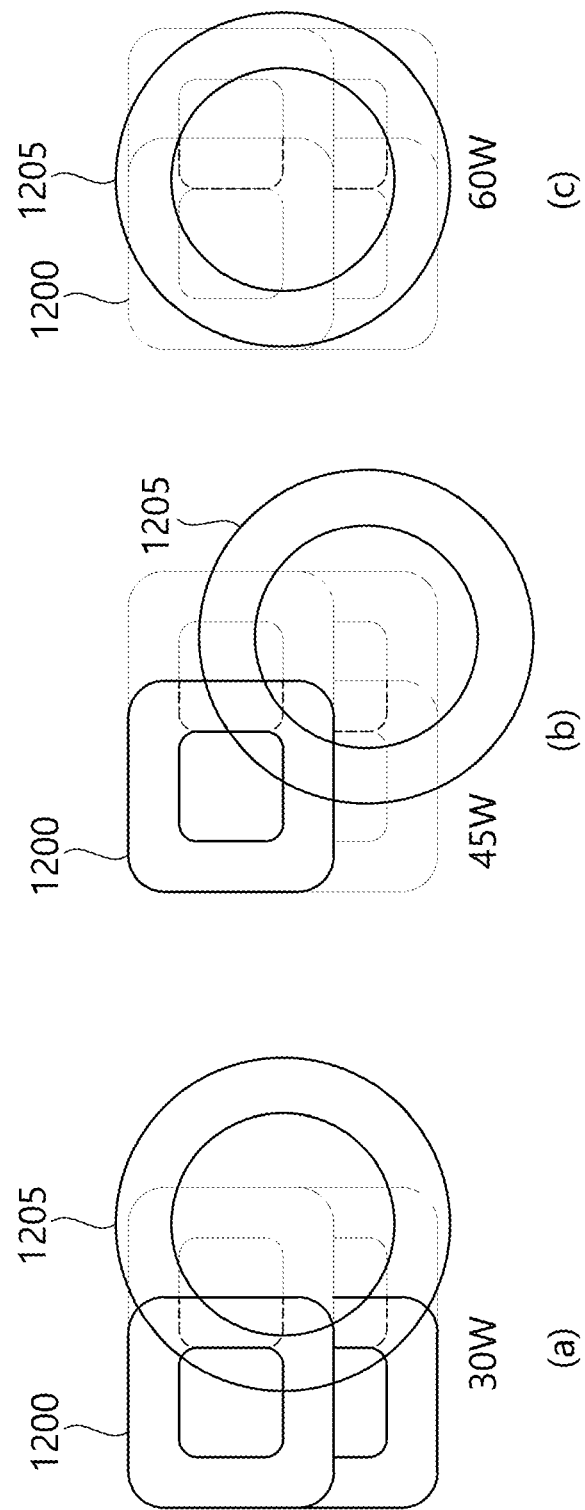
FIG. 13 illustrates a method of selectively driving a multi-coil according to an embodiment.

Meanwhile, the primary coil according to the present embodiment may provide an individually set maximum output. The maximum output set may be the same for all primary coils or may be different. For example, the maximum output set at the primary coil 1201 of the first layer may be 15 W, the maximum output set at the primary coil 1202 of the second layer may be 15 W, the maximum output set at the primary coil 1203 of the third layer may be 15 W, and the maximum output set at the primary coil 1204 of the fourth layer may be 15 W. In this case, the maximum output that may be provided throughout the primary coil array 1201, 1202, 1203, and 1204 is 15 W+15 W+15 W+15 W=60 W. In this state, when only two primary coils are driven according to the position and/or the request of the reception device ((a) of FIG. 13), wireless charging may be performed at a total output of 30 W, when three primary coils are driven according to the position and/or the request of the reception device ((b) of FIG. 13), wireless charging may be performed at a total output of 45 W, and when four primary coils are driven according to the position and/or the request of the reception device ((c) of FIG. 13), wireless charging may be performed at a total output of 60 W. Accordingly, the primary coil array 1201, 1202, 1203, 1204 may provide adaptive output depending on the position (or misalignment) or power class of the reception device, as well as the alignment freedom, and may be compatible with a variety of applications ranging from several W class low power reception devices to tens of W medium power reception devices (or 60 W or less), increasing scalability. Hereinafter, for convenience of description, it is assumed that the maximum outputs set for all primary coils included in the primary coil array 1201, 1202, 1203, and 1204 are the same, but are not limited thereto.

In the present disclosure, the primary coil array using four primary coils is disclosed, but the present disclosure may also include a case where two, three, five, and more primary coils are included in the primary coil array.

As the number of primary coils, the charging area, and the output are extended and increased, the importance of communication control between the wireless power transmission device and the reception device is also increased. A primary coil selection algorithm required for driving in a multi-coil wireless charging system should also be defined. Also, a method of compensating for an unchargeable state due to coil misalignment between a wireless power transmission device (to 60 W class) and a wireless power reception device (15 to 60 W class) based on the primary coil selection algorithm and detecting a foreign object is also required.

First, a communication control method between a tens of W class (medium power class) multi-coil wireless power transmission device and a reception is disclosed.

Figure 14:
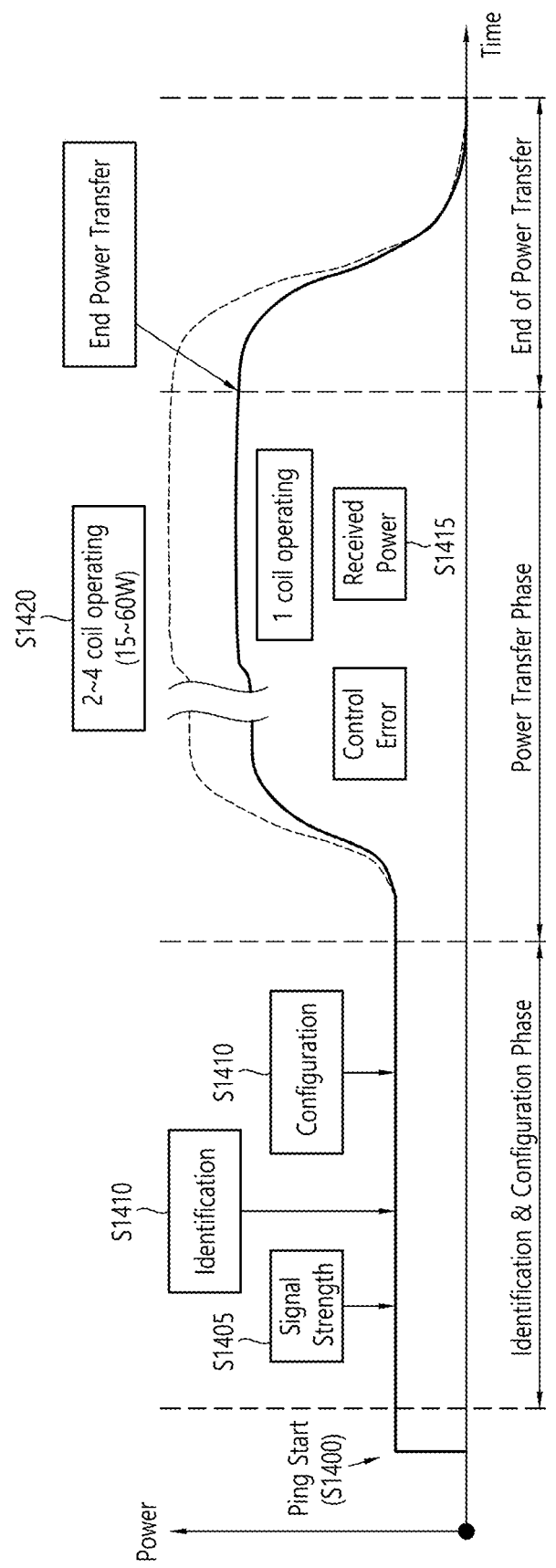
FIG. 14 illustrates a time-based power transfer phase of a multi-coil based wireless power transmission device according to an embodiment.
Figure 15:
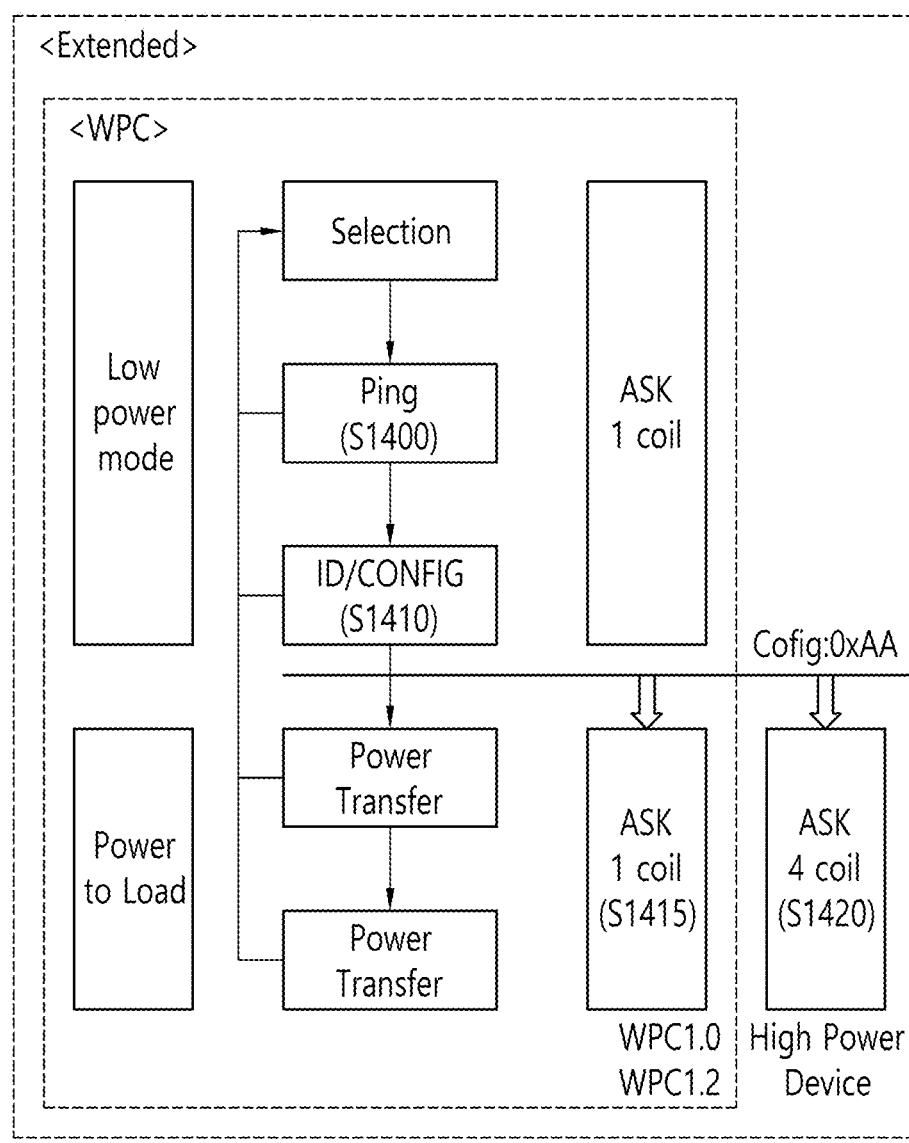
FIG. 15 is a block diagram illustrating a control method of selectively operating a single coil and a multi-coil according to an embodiment.

FIG. 14 illustrates a time-dependent power transfer phase of a multi-coil based wireless power transmission device according to an embodiment, and FIG. 15 is a block diagram illustrating a control method of selectively operating a single coil and a multi coil according to an embodiment.

When the wireless power transmission device 100 drives a single primary coil, the communication/control unit 120 as described in FIG. 4 may perform communication based on ASK in accordance with the WPC standard (WPC v1.0 or v1.2). When the wireless power transmission device 100 according to the present embodiment simultaneously drives the multiple coils as shown in FIGS. 12A and 12B, the wireless power transmission device 100 may perform wireless charging according to a 60 W class application. When the multiple coils are driven simultaneously, an output of the wireless power reception device 200 also changes as the wireless power transmission device 100 adjusts transmission power according to a type of the wireless power reception device 200. The wireless power transmission device 100 initially performs ASK communication control with a primary coil having the best signal quality of modulation depth or best signal strength through ASK communication between the wireless power transmission device 100 and the wireless power reception device 200 for multi-coil wireless charging (i.e., 15 to 60 W class).

Referring to FIGS. 14 and 15, the wireless power transmission device 100 sequentially transmits an ASK-based ping signal for each primary coil of the primary coil array 1201, 1202, 1203, and 1204 (S1400) and each primary coil receives signal strength information on the ping signal from the wireless power reception device 200 (S1405). Through this, the wireless power transmission device 100 may obtain four signal strengths and perform ASK communication control using a primary coil providing the best signal strength among them. Here, the primary coil array 1201, 1202, 1203, and 1204 may be commonly connected to one communication/control unit 120, and an individual communication/control unit 120 may be connected to each primary coil. In the latter case, four communication/control units are required.

Thereafter, in an identification and configuration phase (S1410), the wireless power reception device 200 may drive a single coil or multiple coils using reserved bits of a specific configuration packet (S1415, S1420). For example, if a header or the specific configuration packet of the reserved bits included in the configuration packet is related to a low power class standard (i.e., WPC v1.0 or v2.0) or a single primary coil, the wireless power transmission device 100 performs low power wireless charging of 15 W or less by using the single primary coil (S1415). Meanwhile, if the header of the specific configuration packet or the reserved bits included in the configuration packet is related to a medium power class standard (i.e., set to a value (i.e., 0xAA) different from the header of the configuration packet at the low power class standard), the wireless power transmission device 100 may simultaneously drive the multiple coils according to the medium power class (15 to 60 W) (S1420). For example, an application below 15 W are covered by single primary coil driving, while an application of 15 to 60 W are covered by two or more coils simultaneously, resulting in greater compatibility and scalability.

As an example, a method of driving (activating) or not driving (deactivating) a specific primary coil may include turning on/off the inverter connected in a 1:1 manner. Thus, a method of driving a plurality of primary coils may include turning on a plurality of inverters. For example, referring to FIG. 12C, when inverters respectively connected to the primary coil 1201 of the first layer, the primary coil 1202 of the second layer, the primary coil 1203 of the third layer, and the primary coil 1204 of the fourth layer are a first inverter 1211, a second inverter 1212, a third inverter 1213, and a fourth inverter 1214, respectively, in the case of (a) of FIG. 13, only the second inverter 1212 connected to the primary coil 1202 of the second layer and the third inverter 1213 connected to the primary coil 1203 of the third layer are turned on and the first inverter 1211 and the fourth inverter 1214 are turned off.

As another example, the operation of driving a specific primary coil may include turning on an inverter corresponding to a cell to which the specific primary coil belongs and switching the inverter to the specific primary coil. This is a coil selection method that may be used to further extend the charging area. For example, assuming that the primary coil array 1201, 1202, 1203, and 1204 as shown in FIG. 12A is a cell, the charging area may be further extended when a plurality of cells are combined, as compared with a single cell.

When the wireless power transmission device 100 simultaneously drives a plurality of primary coils in the primary coil array, the charging area is extended and the output power is increased as compared with the single coil driving method, but when a reception device of a medium power class (i.e., 15 to 60 W class) is driven, efficiency of charging may be significantly lowered or it may be impossible to perform charging. That is, in a situation where the plurality of primary coils are to be driven simultaneously, when the wireless power reception device 200 placed only on part of the wireless power transmission device 100, the plurality of primary coils may not be simultaneously driven by the ASK communication algorithm. Therefore, in a multi-coil wireless charging system such as (N primary coils: one secondary coil), charging of a medium power class may be continuously performed by driving the primary coil(s) overlapping an area where the secondary coil is located in the primary coil array to compensate for misalignment due to a difference in size between the primary coils and the secondary coil. This may be expressed by a flowchart as shown in FIG. 16.

Figure 16:
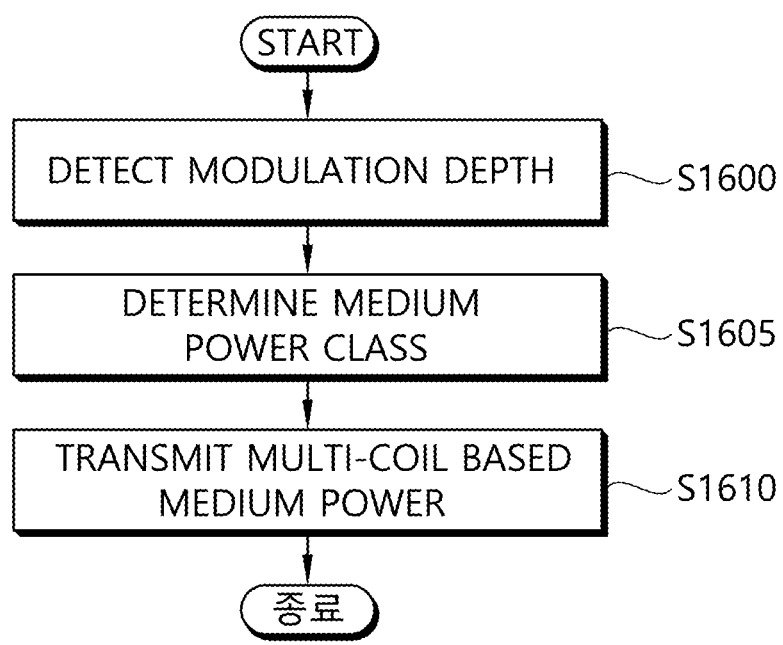
FIG. 16 is a flowchart illustrating a method of selecting a plurality of primary coils according to an embodiment.

FIG. 16 is a flowchart illustrating a method of selecting a plurality of primary coils according to an embodiment.

Referring to FIG. 16, the wireless power transmission device 100 detects a size of a modulation depth using ASK communication (modulation detection) (S1600). Since there is a difference in modulation depth depending on the area where the primary coil array and the secondary coil overlap (or the degree of coupling), the wireless power transmission device 100 may compare values based on the presence or absence of the secondary coil in each primary coil by the size of the modulation depth. In this case, a reference value of the modulation depth for detecting the presence/absence of the secondary coil may be defined or set in advance. Therefore, if a change in the modulation depth of a predetermined range or greater is detected in the primary coil (i.e., if the size of the modulation depth is greater than or equal to the reference value), the wireless power transmission device 100 may recognize that the secondary coil is located on the corresponding primary coil. For example, when the secondary coil is effectively located on the right two primary coils of the primary coil array 1201, 1202, 1203, and 1204 as shown in FIG. 13(a), a change in the modulation depth of the predetermined range or greater may be detected in the right two primary coils, and thus, the wireless power transmission device 100 may recognize that the secondary coil is effectively located on the right two primary coils. Through this method, the wireless power transmission device 100 may predict or identify the position of the secondary coil and determine which primary coils is to be driven in a future medium power class power transfer phase.

In the present embodiment, the wireless power transmission device 100 determines whether the wireless power reception device 200 or the secondary coil is present or not based on the modulation depth, but in addition to this, the wireless power transmission device 100 may determine the presence/absence of the wireless power reception device or the secondary coil in various ways. As an example, the wireless power transmission device 100 may determine whether or not the wireless power reception device 200 or the secondary coil is present based on a change in a voltage profile of each primary coil in the primary coil array. As another example, the wireless power transmission device 100 designed with a specific resonance frequency may apply a voltage at the corresponding resonance frequency and determine whether or not the wireless power reception device 200 is present based on a resonance voltage at the primary coil.

Next, the wireless power transmission device 100 determines whether the wireless power reception device 200 is a medium power class (i.e. 60 W or less) receiver (S1605). As an example, in the identification and configuration phase, the wireless power transmission device 100 determines whether multiple coils may be driven using a header of a specific configuration packet received from the wireless power reception device 200 or reserved bits included in the specific configuration packet. For example, if the header of the specific configuration packet or the reserved bits included in the configuration packet is related to a low power class standard (i.e., WPC v1.0 or v2.0) or is related to a single primary coil, the wireless power transmission device 100 performs low power class wireless charging of 15 W or less using the corresponding single primary coil.

Meanwhile, when the header of the specific configuration packet or the reserved bits included in the configuration packet is related to a medium power class standard (i.e., set to a value (i.e., 0xAA) different from the header of the configuration packet in the low power class standard), the wireless power transmission device 100 may simultaneously drive the multiple coils according to the medium power class (15 to 60 W) (S1610). As an example, the plurality of primary coils simultaneously driven by the wireless power transmission device 100 may be selected as primary coils in which a change in modulation depth or greater is detected in phase S1600. As another example, the plurality of primary coils simultaneously driven by the wireless power transmission device 100 may be selected as primary coils in which a change in a voltage profile over a predetermined range is detected. As another example, the plurality of primary coils simultaneously driven by the wireless power transmission device 100 may be selected as primary coils for generating a resonance voltage with respect to a voltage applied at a resonance frequency.

Figure 17:
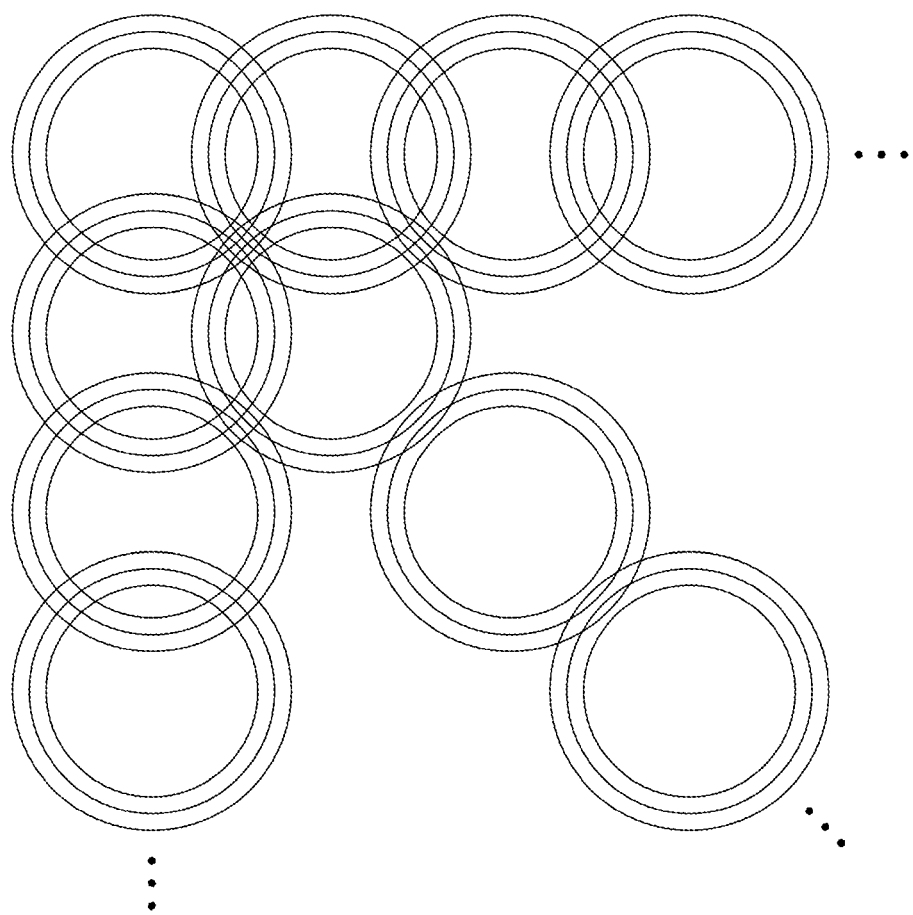
FIG. 17 is a conceptual diagram of enlarging a charging area by operating a primary coil array according to an embodiment.

In FIGS. 12A and 12B, since an area of the primary coil array covered by four primary coils is defined as a charging area, charging may be performed only in a corresponding charging area. Especially, in the case of an application of 45 to 60 W, for which four primary coils need to be simultaneously driven, desired power transfer may be performed only when the secondary coil is magnetically coupled to all four primary coils. In order to increase user convenience, the charging area may be extended by operating a larger number of primary coil arrays as shown in FIG. 17. For example, a scheme of simply connecting the primary coils in parallel may be considered, but this is not efficient in terms of price and size. Therefore, hereinafter, an efficient design method that may extend the charging area at low cost and small size in extending the wireless charging system to N coils is presented.

Figure 18:
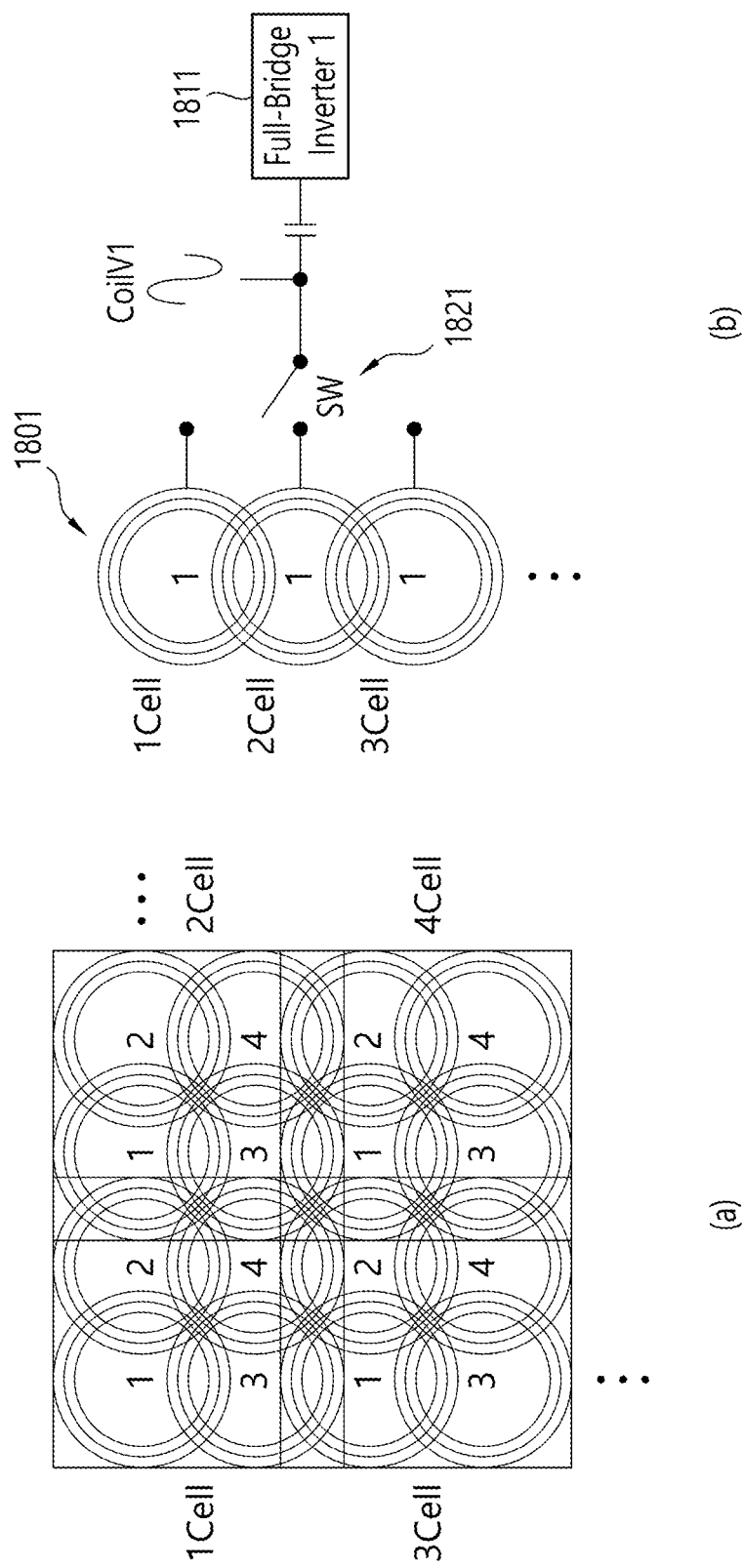
FIG. 18 is a plan view illustrating a primary coil array included in a wireless power transmission device according to another embodiment.

FIG. 18 is a plan view illustrating a primary coil array included in a wireless power transmission device according to another embodiment.

Referring to FIG. 18, the charging area may be extended by arranging a plurality of cells including a primary coil array, which is in an i×j matrix form, again in a matrix form of x×y. FIG. 18 shows a case where i=j=2. If x=y=2, the wireless power transmission device 100 may include a total of 16 primary coils.

In an aspect, each cell may include the same number of primary coils. For example, one cell may include four primary coils.

In another aspect, each cell may have a primary coil array of the same form. For example, one cell may have a 2×2 primary coil array.

A plurality of inverters may be provided to drive the cell array. However, when one inverter corresponds to one primary coil in a 1:1 manner, the number of inverters is required as much as the number of primary coils, which is a major cause of unit price increase. When the size of the secondary coil is considered, not all primary coils may be driven at the same time, and in view of this, one inverter may be designed to be connected to n primary coils through a switch. Here, when the n primary coils to which one inverter is connected by the switch is assumed to be a primary coil extension set, the primary coils included in the primary coil extension set may belong to different cells. For example, if the primary coil in the upper left of each cell is called coil #1, all coils #1 belonging to different cells 1, 2, 3, . . . as shown in (b) are defined as the primary coil extension set 1 1801. The primary coil extension set 1 1801 may be configured to be connected (i.e., share the same inverter) to the same first inverter 1811 and an analog-to-digital converter (ADC) (not shown)) through a switch 1821.

That is, the primary coil extension set may include the primary coils at positions spaced apart from each other and each primary coil is configured to be connected to one inverter through the switch, thereby contributing to extension of the charging area.

Meanwhile, the number of inverters driving the cell array may be determined based on the number of primary coils included in one cell. As shown in FIG. 18, when one cell includes four primary coils, a total of four inverters may be determined regardless of the number of cells. In FIG. 18, if the inverters and the primary coils are connected in a 1:1 manner, 16 inverters are required. However, since only 4 inverters are needed in the present embodiment, the number of inverters is reduced to ¼. More generally, when the number of primary coils configuring one cell is n and the number of cells is m, a total of n×m primary coils exist. In order to connect all the primary coils with a dedicated inverter, n×m inverters are required. However, according to the present embodiment, only n inverters are required, so that the number of inverters is reduced to 1/m. That is, no matter how many the number m of cells is increased to extend the charging area, it is possible to operate with only n inverters (or inverters and ADCs).

Figure 19:
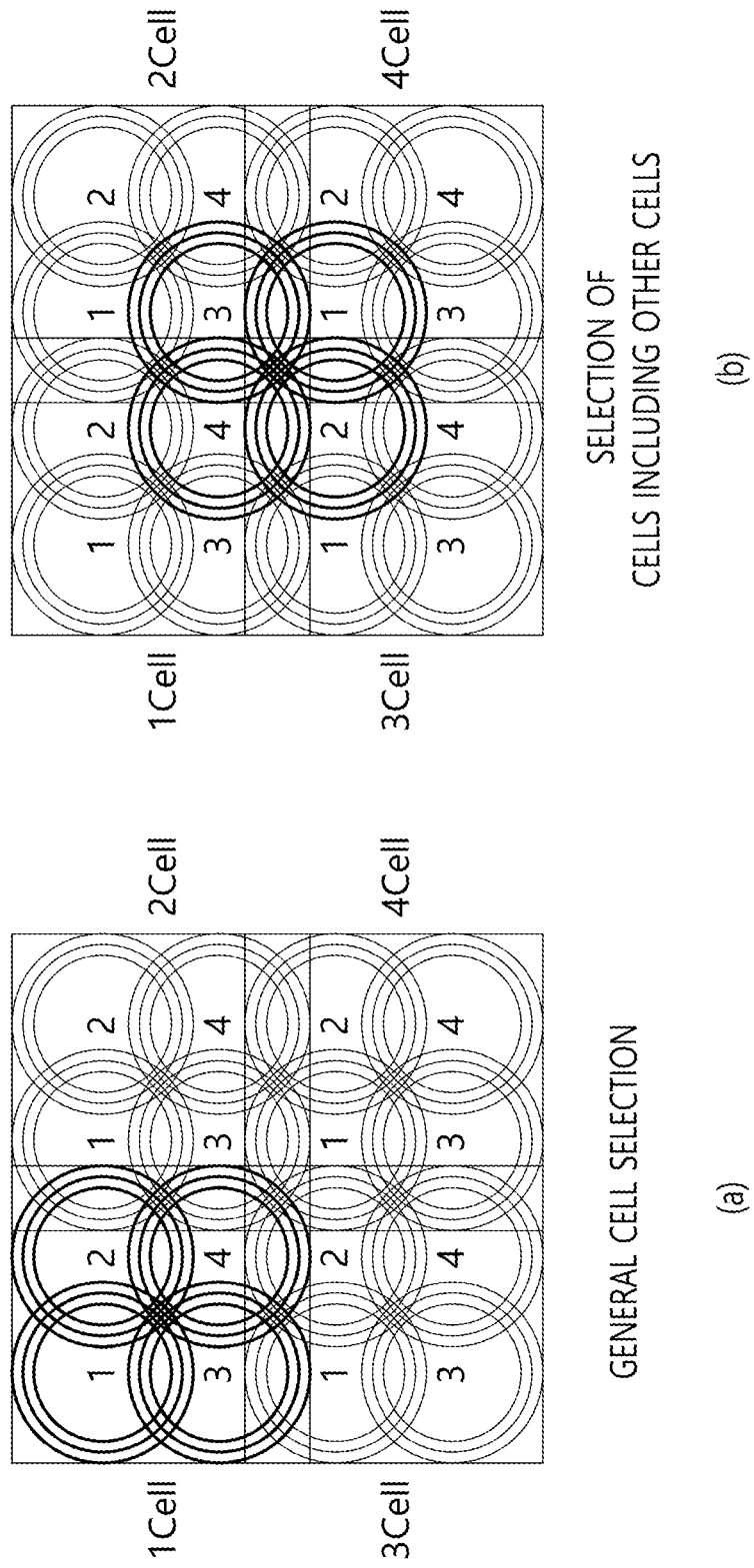
FIG. 19 illustrates a method of selecting a charging area based on a primary coil extension set according to the present embodiment.

FIG. 19 illustrates a method of selecting a charging area based on the primary coil extension set according to the present embodiment. Here, the selection of the charging area is eventually implemented by an operation of driving (or activating or selecting) the primary coils corresponding to a specific area.

Referring to FIG. 19, (a) shows that inverters driving primary coils of each cell are all connected to primary coils of a first cell by a switch, which corresponds to an operation of driving the primary coils in a general cell unit. In (b), a first inverter for driving a primary coil extension set 1 (primary coils #1) is connected to a primary coil of a fourth cell by a switch, a second inverter for driving a primary coil extension set 2 (primary coils #2) is connected to a primary coil of a third cell by a switch, a third inverter for driving a primary coil extension set 3 (primary coils #3) is connected to a primary coil of a second cell by a switch, and a fourth inverter for driving a primary coil extension set 4 (primary coils #4) is connected to a primary coil of a first cell by a switch. That is, the primary coils are driven by using the primary coil extension set. In this way, since the first, second, third and fourth primary coils are used only once even when sharing one inverter with an adjacent cell, any combination of four coils may be simultaneously driven at any position.

Figure 20:
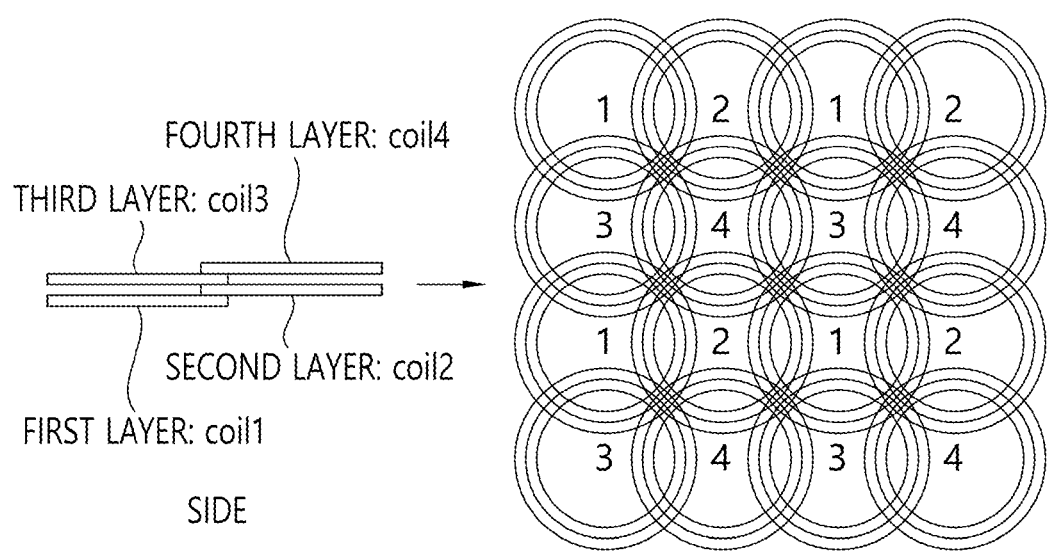
FIG. 20 illustrates a physical arrangement of primary coils in case of enlarging a charging area according to an embodiment.

As illustrated in FIGS. 18 and 19, in the array of the primary coils in units of cells, horizontal and vertical arrays may configure the primary coil #1 of each cell in the first layer, the primary coil #2 of each cell in the second layer, the primary coil #3 of each cell in the third layer, and the primary coil #4 of each cell in the fourth layer as shown in FIG. 20. That is, by arranging the primary coils having the same index to have the same number of layers, N primary coils may be configured. In the wireless charging system, the degree of coupling changes according to a distance to the surface and physical properties change accordingly. However, since the structure of FIG. 20 has the same distance between all layers, the structure of FIG. 20 may be operated with the same resonance capacitor and decoding of a communication signal may also have the same performance.

A method of selectively driving (or selecting) a plurality of primary coils may be performed based on the position of the secondary coil or may be performed according to power demand (i.e., requested power) of the wireless power reception device 200. In particular, in a case where the wireless power reception device 200 of several tens of W class (i.e., 60 W class) is designed with a single coil and a multi-coil structure, a method of selectively driving primary coils according to a battery or a variation of a load and controlling power is required.

Figure 21:
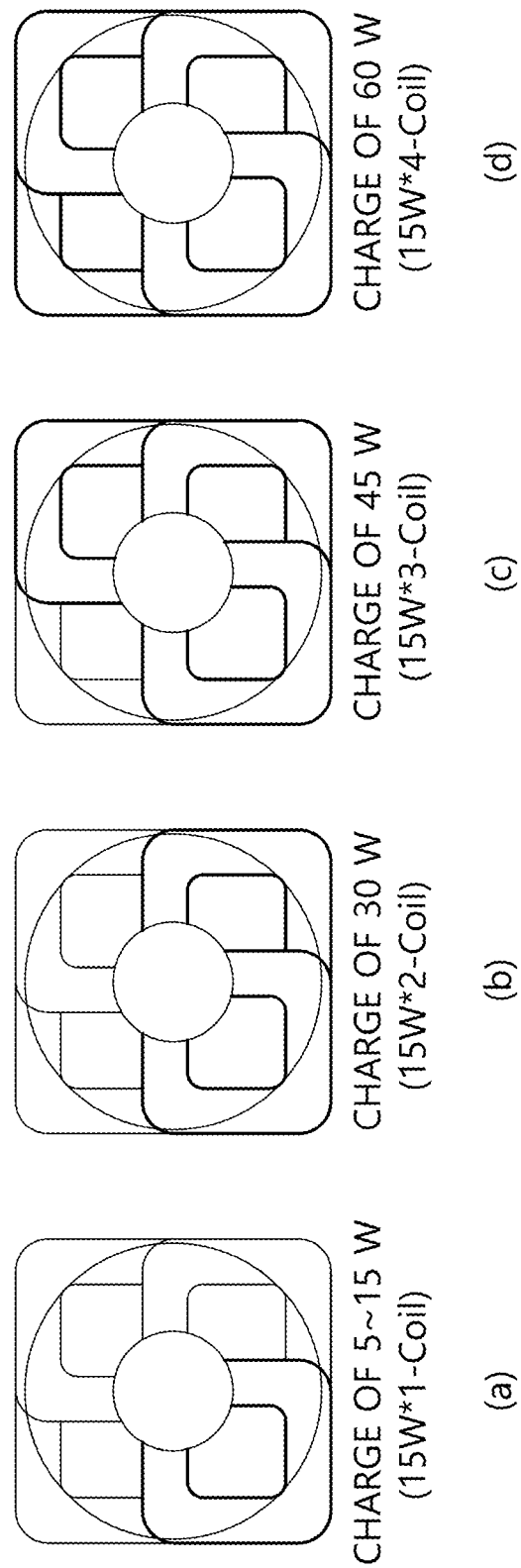
FIG. 21 is a diagram illustrating a method of selecting a plurality of primary coils according to another embodiment.

FIG. 21 is a diagram illustrating a method of selecting a plurality of primary coils according to another embodiment. This is a method of selecting or changing the number of primary coils adaptively driven according to power demand (or power class or profile) of the wireless power reception device 200 having a single coil structure.

Referring to FIG. 21, the wireless power transmission device 100 adaptively selects and changes the primary coil according to power demand of the wireless power reception device 200.

As an example, the wireless power transmission device 100 determines whether the wireless power reception device 200 is a medium power class (i.e., 60 W or less) receiver through a power class or profile of the wireless power reception device 200, and activates at least one primary coil to supply power according to the corresponding power class or profile. For example, if the power class or profile of the wireless power reception device 200 is a 5 to 15 W class, one primary coil is activated as shown in (a), if the power class or profile of the wireless power reception device 200 is a 15 to 30 W class, two primary coils are activated as shown in (b), if the power class or profile of the wireless power reception device 200 is a 30 to 45 W class, three primary coils are activated as shown in (c), and if the power class or profile of the wireless power reception device 200 is a 45 to 60 W class, four primary coils are activated as shown in (d).

As another example, the wireless power transmission device 100 determines whether the wireless power reception device 200 is a medium power class (i.e., 60 W or less) receiver through a power class or profile of the wireless power reception device 200, and activates at least one primary coil based on power demand (i.e., requested power) of the wireless power reception device 200 in a power transfer phase. For example, if requested power of the wireless power reception device 200 is a 15 W or less, one primary coil is activated as shown in (a), if the requested power of the wireless power reception device 200 is a 30 W or less, two primary coils are activated as shown in (b), if the power class or profile of the wireless power reception device 200 is a 45 W or less, three primary coils are activated as shown in (c), and if the requested power of the wireless power reception device 200 is 60 W or less, four primary coils are activated as shown in (d).

Figure 22:
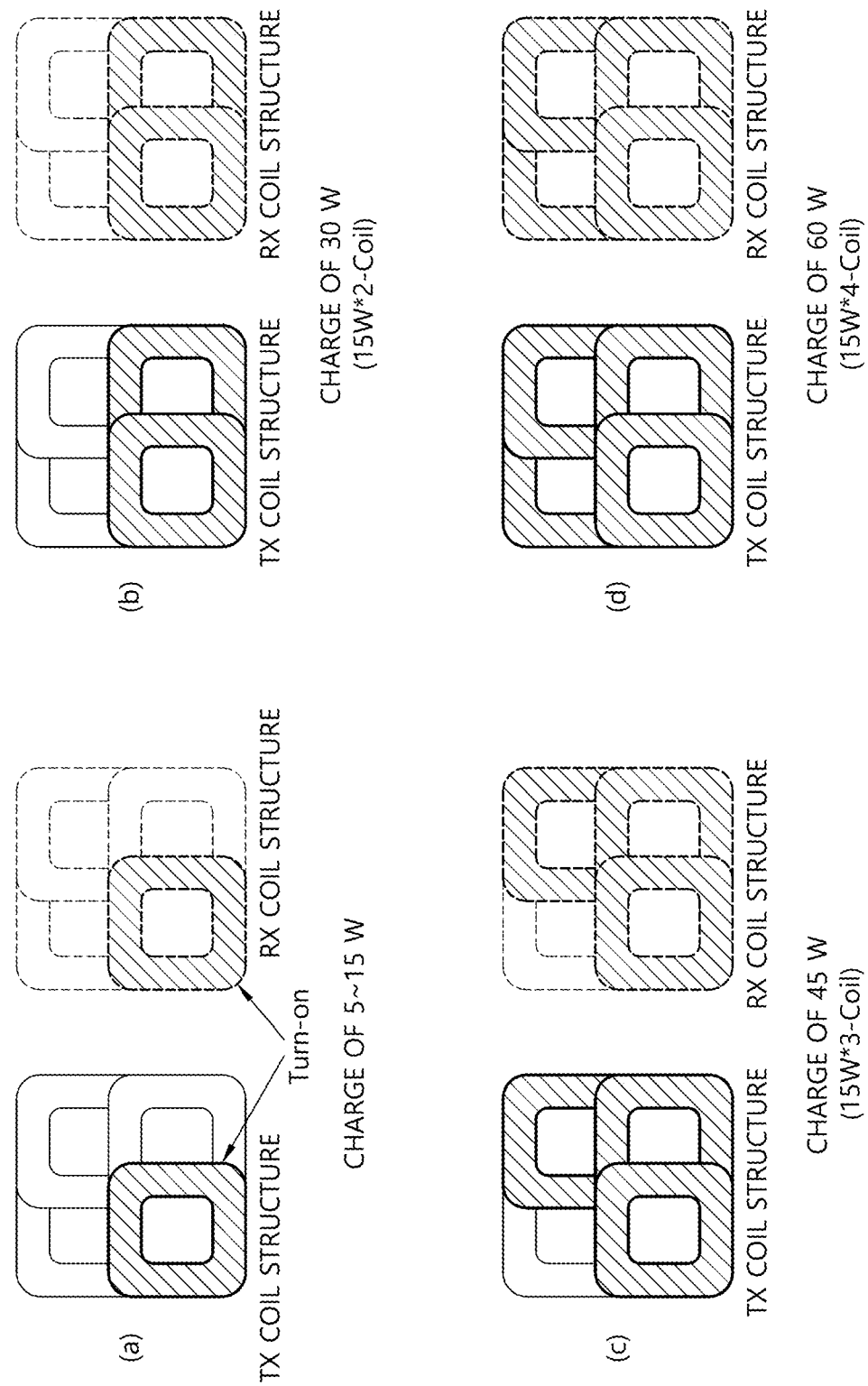
FIG. 22 is a diagram illustrating a method of selecting a plurality of primary coils according to another embodiment.

FIG. 22 is a diagram illustrating a method of selecting a plurality of primary coils according to another embodiment. This is a method of selecting or changing the number of primary coils driven adaptive to power demand of the wireless power reception device 200 having a multi-coil structure.

Referring to FIG. 22, in a situation where the wireless power reception device 200 includes four multi-coils, for example, the wireless power transmission device 100 drives the coils as shown in (a) to (d) according to requested power of the battery or the wireless power reception device 200. (a) is a case where the wireless power transmission device 100 turns on (drives) only one primary coil when the requested power of the wireless power reception device 200 is 15 W or less. (b) is a case where the wireless power transmission device 100 turns on two primary coils when the requested power of the wireless power reception device 200 is 30 W or less. (c) is a case where the wireless power transmission device 100 turns on three primary coils when the requested power of the wireless power reception device 200 is 45 W or less. (d) is a case where the wireless power transmission device 100 turns on four primary coils when the requested power of the wireless power reception device 200 is 60 W or less.

The position of the primary coil driven (or selected) in (a) to (d) is not fixed. If coupling between a primary coil at another position and the secondary coil is the largest, the primary coil at the other position may be driven.

The requested amount of power may vary in cases where the type of application is a laptop, a portable speaker, a pad, a monitor, or a mobile phone. In order to cover the range of power required by various applications with a single wireless power reception device, a modularized wireless power reception device needs to be introduced.

Figure 23:
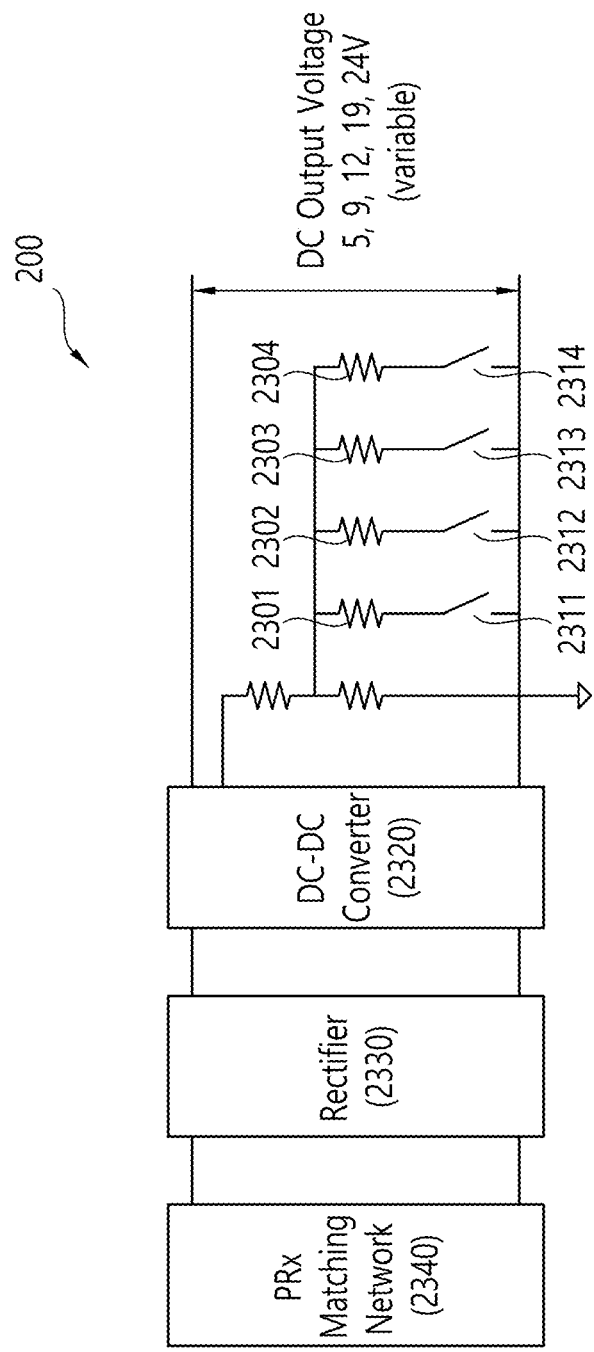
FIG. 23 is a block diagram illustrating a modularized wireless power reception device according to an embodiment.

FIG. 23 is a block diagram illustrating a modularized wireless power reception device according to an embodiment.

Referring to FIG. 23, since an output voltage (DC output voltage) is different according to received power, a circuit must be designed to allow the charging voltage to be changed in order to modularize the wireless power reception device 200. To this end, the wireless power reception device 200 may include a plurality of parallel feedback resistors 2301, 2302, 2303, and 2304 based on different battery charging voltages 5, 9, 12, 19, and 24V, switches 2311, 2312, 2313, and 2314 coupled to the resistors, respectively, a DC-DC converter 2320, a rectifier 2330, and a reception matching network 2340. The wireless power reception device 200 may change an output voltage of the DC-DC converter 2320 through switching with the parallel feedback resistors 2301, 2302, 2303, and 2304.

When charging with medium power of tens of W class, overheating due to a foreign object may be problematic. Hereinafter, a method of detecting a foreign object in designing a medium-power multi-coil wireless power transmission device 100 according to the present embodiment is disclosed.

Figure 24:
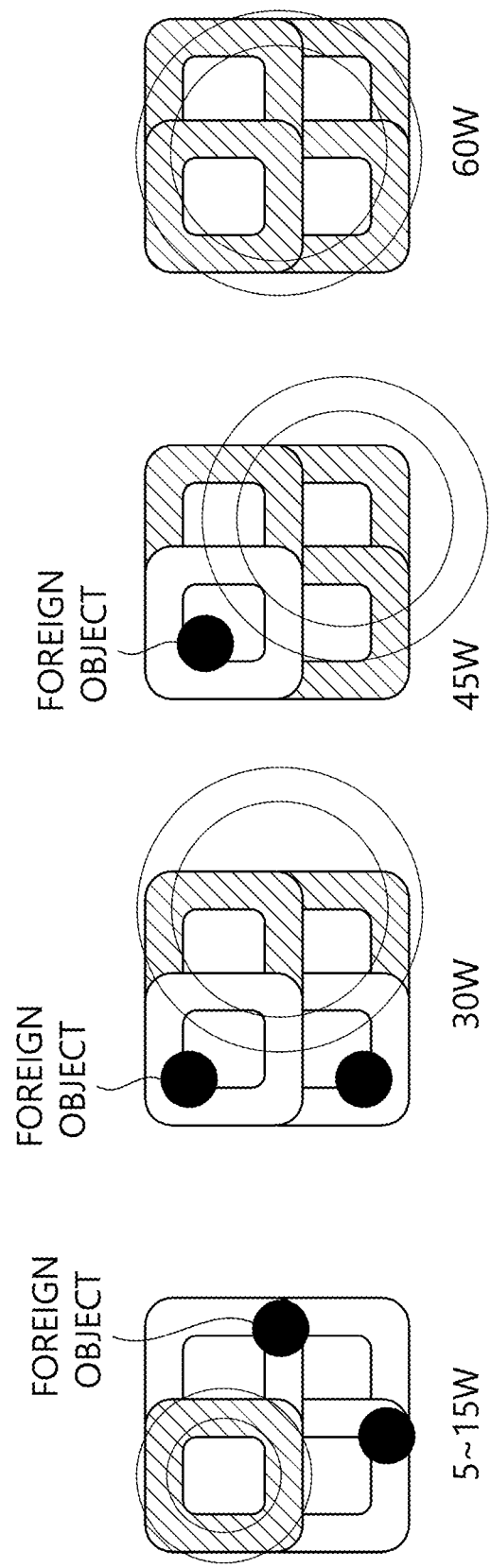
FIG. 24 illustrates a method of detecting a foreign object and selectively driving a primary coil according to an embodiment.

FIG. 24 illustrates a method of detecting a foreign object and selectively driving a primary coil according to an embodiment.

Referring to FIG. 24, the wireless power transmission device 100 determines activation and deactivation of the primary coils according to a position of a foreign object on the primary coil array. The wireless power transmission device 100 continuously charges the wireless power reception device 200 to a specific power level (i.e., 60 W) or less by using the remaining primary coils other than a primary coil overlapping the foreign object so that communication and wireless charging with the wireless power reception device 200 is not interrupted. When a foreign object is located on some primary coils, the wireless power transmission device 100 may start charging to 60 W or less by driving normally operable multiple coils by applying an implementable separate foreign object detection algorithm such as FRS, Q-Method, PLD, etc. A specific foreign object detection method may follow an implementation method of each manufacturer.

For example, if the foreign object is located over the primary coils in the first to third quadrants of the primary coil array as shown in (a), only the primary coil at the fourth quadrant is driven (activated). In this case, since only one primary coil is activated, power of 15 W or less may be supplied. If the foreign object is located over the primary coils in the third to fourth quadrants of the primary coil array as shown in (b), the primary coils in the first and second quadrants are driven (activated). In this case, since two primary coils are activated, power of 30 W or less may be supplied. If the foreign object is located only in the primary coil in the fourth quadrant of the primary coil array as shown in (c), the primary coils of the first to third quadrants are driven (activated). In this case, since three primary coils are activated, power of 45 W or less may be supplied. If there is no foreign object as shown in (d), all four primary coils may be driven (activated). In this case, since four primary coils are activated, power of 60 W or less may be supplied.

Wireless power transmission and reception devices may provide a very convenient user experience and interface (UX/UI). That is, a smart wireless charging service may be provided. The smart wireless charging service may be implemented based on the UX/UI of the smartphone including the wireless power transmission device. For these applications, an interface between a processor of the smartphone and the wireless charging receiver allows for "drop and play" bidirectional communication between the wireless power transmission device and the reception device.

As an example, the user may experience a smart wireless charging service at a hotel. When the user enters a hotel room and places the smartphone on a wireless charger in the room, the wireless charger transmits the wireless power to the smartphone, and the smartphone receives the wireless power. In this process, the wireless charger transmits information on the smart wireless charging service to the smartphone. When the smartphone detects that the smartphone is located on the wireless charger, detects reception of wireless power, or receives information on the smart wireless charging service from the wireless charger, the smartphone enters a state for inquiring the user about opt-in regarding an additional feature. To this end, the smartphone may display a message on a screen in a manner with or without an alarm sound. An example of the message may include phrases such as "Welcome to ###hotel. Select "Yes" to activate smart charging functions: Yes|No Thanks." The smartphone receives the user's input of selecting Yes or No Thanks and performs a following procedure selected by the user. If Yes is selected, the smartphone sends corresponding information to the wireless charger. The smartphone and wireless charger then perform the smart charging function.

The smart wireless charging service may also include receiving Wi-Fi credentials auto-filled. For example, the wireless charger transmits Wi-Fi credentials to the smartphone, and the smartphone automatically inputs the Wi-Fi credentials received from the wireless charger by executing an appropriate app.

The smart wireless charging service may also include executing a hotel application that provides hotel promotions or obtaining remote check-in/check-out and contact information.

As another example, the user may experience the smart wireless charging service in a vehicle. When the user gets in the vehicle and places the smartphone on a wireless charger, the wireless charger transmits wireless power to the smartphone, and the smartphone receives the wireless power. In this process, the wireless charger transmits information on the smart wireless charging service to the smartphone. When the smartphone detects that it is located on the wireless charger, detects reception of wireless power, or receives information on the smart wireless charging service from the wireless charger, the smartphone enters a state of inquiring the user about an identity.

In this state, the smartphone is automatically connected to the vehicle via Wi-Fi and/or Bluetooth. The smartphone may display a message on a screen in a manner with or without an alarm sound. An example of the message may include phrases such as "Welcome to your car. Select "Yes" to sync device with in-car controls: Yes No Thanks." The smartphone receives a user's input of selecting Yes or No Thanks and performs a following procedure selected by the user. If Yes is selected, the smartphone sends corresponding information to the wireless charger. In addition, the smartphone and the wireless charger may perform the in-vehicle smart control function by driving in-vehicle application/display software. The user may enjoy desired music and may check a regular map position. The in-vehicle application/display software may include capability to provide a synchronized access for passers-by.

As another example, the user may experience smart wireless charging at home. When the user enters a room and places the smartphone on a wireless charger in the room, the wireless charger transmits wireless power to the smartphone and the smartphone receives the wireless power. In this process, the wireless charger transmits information on the smart wireless charging service to the smartphone. When the smartphone detects that it is located on the wireless charger, detects reception of wireless power, or receives information on the smart wireless charging service from the wireless charger, the smartphone enters a state of inquiring the user about opt-in regarding an additional feature. To this end, the smartphone may display a message on a screen in a manner with or without an alarm sound. An example of the message may include phrases such as "Hi xxx, Would you like to activate night mode and secure the building?: Yes No Thanks." The smartphone receives a user's input of selecting Yes or No Thanks and performs a following procedure selected by the user. If Yes is selected, the smartphone sends corresponding information to the wireless charger. The smartphone and the wireless charger may at least recognize the user's pattern and recommend the user to lock doors and windows, turn off the lights, or set an alarm.

All the components and phases of the wireless power transmission method and device or the reception device and method according to the embodiment of the present disclosure described above are essential, and thus, the wireless power transmission device and method or the reception device and method described above may be performed including some or all of the components or phases. In addition, the embodiments of the wireless power transmission device and method or the reception device and method may be performed in combination with each other. In addition, the components or phases described above may not be necessarily performed in the order described above and the phases described later may be performed before the phases described first.

The foregoing embodiments and advantages are merely exemplary and are not to be construed as limiting the present disclosure. The present teachings can be readily applied to other types of devices. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A wireless power transmission device for transmitting wireless power to a wireless power reception device, the device comprising:
   a primary coil array forming magnetic coupling with a secondary coil provided in the wireless power reception device to transmit wireless power to the wireless power reception device, wherein the primary coil array includes a plurality of primary coils each having an individually set maximum output;
   a plurality of inverters connected to the plurality of primary coils, respectively, to selectively drive the plurality of primary coils; and
   a controller configured to control communication with the wireless power reception device and the plurality of inverters such that at least one primary coil is driven based on a degree of magnetic coupling formed by each primary coil with the secondary coil, thereby determining an output, which can be provided to the wireless power reception device by the primary coil array, within a value obtained by adding all the maximum outputs individually set to the plurality of primary coils,
   wherein the plurality of primary coils for transmitting wireless power include four primary coils arranged horizontally in a 2×2 matrix form and vertically overlapping with each other.

2. The device of claim 1, wherein
   all the individually set maximum outputs of the plurality of primary coils are equal, and
   the output which can be provided by the primary coil array is determined according to the number of the plurality of primary coils included in the primary coil array.

3. The device of claim 2, wherein
   when the individually set maximum output is 15 W, a providable output is 15 W or less based on the plurality of inverters driving one of the four primary coils, the providable output is 30 W or less based on the plurality of inverters driving two of the four primary coils, the providable output is 45 W or less based on the plurality of inverters driving three of the four primary coils, and the providable output is 60 W or less based on the plurality of inverters driving the four primary coils.

4. The device of claim 1, wherein
   the controller is further configured to perform communication with the wireless power reception device based on an amplitude shift keying (ASK) scheme.

5. The device of claim 4, wherein
   the degree of magnetic coupling is a size of a modulation depth, and a size of the modulation depth of the at least one primary coil is changed over a predetermined range.

6. The device of claim 4, wherein
   the degree of magnetic coupling is a size of a voltage profile of each of the primary coils, and a voltage profile of the at least one primary coil is changed over a predetermined range.

7. The device of claim 4, wherein
   the degree of magnetic coupling is the presence or absence of a resonance voltage at each of the primary coil, and the at least one primary coil generates the resonance voltage.

8. The device of claim 1, further comprising:
   at least one second cell if the primary coil array is defined as one first cell, wherein one inverter is connected to one of one primary coil included in the first cell and one primary coil included in the second cell through a switch.

9. The device of claim 1, further comprising:
a plurality of parallel feedback resistors providing a variable charging voltage.

10. A method for transmitting wireless power to a wireless power reception device, the method comprising:
selectively driving a plurality of primary coils each having an individually set maximum output using a plurality of inverters respectively connected to the plurality of primary coils;
controlling communication with a wireless power reception device and the plurality of inverters such that at least one primary coil is driven based on a degree of magnetic coupling formed by each primary coil with a secondary coil provided in the wireless power reception device;
determining an output which can be provided to the wireless power reception device by a primary coil array including the plurality of primary coils within a value obtained by adding all the maximum outputs individually set to the plurality of primary coils; and
transmitting wireless power to the wireless power reception device through the at least one driven primary coil within the determined output,
wherein the plurality of primary coils for transmitting wireless power include four primary coils arranged horizontally in a 2×2 matrix form and vertically overlapping with each other.

11. The method of claim 10, wherein
all the individually set maximum outputs of the plurality of primary coils are equal, and the output which can be provided by the primary coil array is determined according to the number of the plurality of primary coils included in the primary coil array.

12. The method of claim 11, wherein
when the individually set maximum output is 15 W, a providable output is 15 W or less based on the plurality of inverters driving one of the four primary coils, the providable output is 30 W or less based on the plurality of inverters driving two of the four primary coils, the providable output is 45 W or less based on the plurality of inverters driving three of the four primary coils, and the providable output is 60 W or less based on the plurality of inverters driving the four primary coils.

13. The method of claim 10, wherein
communication with the wireless power reception device is performed based on an amplitude shift keying (ASK) scheme.

14. The method of claim 13, wherein
the degree of magnetic coupling is a size of a modulation depth, and a size of the modulation depth of the at least one primary coil is changed over a predetermined range.

15. The method of claim 13, wherein
the degree of magnetic coupling is a size of a voltage profile of each of the primary coils, and a voltage profile of the at least one primary coil is changed over a predetermined range.

16. The method of claim 13, wherein
the degree of magnetic coupling is the presence or absence of a resonance voltage at each of the primary coil, and the at least one primary coil generates the resonance voltage.

17. The method of claim 10, wherein
at least one second cell is further provided if the primary coil array is defined as one first cell,
wherein one inverter is connected to one of one primary coil included in the first cell and one primary coil included in the second cell through a switch.

* * * * *